US010278012B2

(12) United States Patent
Wang et al.

(10) Patent No.: US 10,278,012 B2
(45) Date of Patent: Apr. 30, 2019

(54) LOCATION-BASED REMINDING METHOD, INDICATION DEVICE, REMINDING DEVICE, AND MOBILE TERMINAL

(71) Applicant: Huawei Technologies Co., Ltd., Shenzhen (CN)

(72) Inventors: Chan Wang, Shenzhen (CN); Henghui Lu, Beijing (CN); Huangwei Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/744,950

(22) PCT Filed: Dec. 31, 2015

(86) PCT No.: PCT/CN2015/100282
§ 371 (c)(1),
(2) Date: Jan. 15, 2018

(87) PCT Pub. No.: WO2017/113366
PCT Pub. Date: Jul. 6, 2017

(65) Prior Publication Data
US 2018/0213354 A1 Jul. 26, 2018

(51) Int. Cl.
*H04W 4/021* (2018.01)
*H04W 68/00* (2009.01)
(Continued)

(52) U.S. Cl.
CPC .......... *H04W 4/021* (2013.01); *G06Q 10/109* (2013.01); *H04L 67/18* (2013.01); *H04M 1/72572* (2013.01); *H04W 68/00* (2013.01)

(58) Field of Classification Search
CPC ....... H04W 4/021; H04W 68/00; H04W 4/02; H04L 67/18; G06Q 10/109; H04M 1/72572
(Continued)

(56) References Cited

U.S. PATENT DOCUMENTS

2002/0086680 A1    7/2002  Hunzinger
2007/0270129 A1* 11/2007  Luo .......................... H04W 4/02
                                                                                                 455/414.1
(Continued)

FOREIGN PATENT DOCUMENTS

| CN | 102970654 | A | 3/2013 | |
| CN | 103024664 | A | 4/2013 | |
| CN | 103248999 | A | 8/2013 | |
| CN | 103248999 | | * 9/2013 | .............. H04W 4/02 |

OTHER PUBLICATIONS

CN103248999, Location-based methods, systems, and program products for performing an action at a user device, Leblanc Chelsea J, Apple Inc,, pp. 54, dated Aug. 14, 2013, year 2013 (Year: 2013).*
(Continued)

*Primary Examiner* — Inder P Mehra
(74) *Attorney, Agent, or Firm* — Conley Rose, P.C.

(57) ABSTRACT

A location-based reminding method includes obtaining, by an indication device, reminding information and at least one reminding account that are set by a user, where each of the at least one reminding account is corresponding to at least one reminding device; generating, by the indication device, first information that includes the reminding information; and sending, by the indication device, the first information to a reminding device corresponding to the at least one reminding account, so that the reminding device corresponding to the at least one reminding account obtains second information according to the first information, where the second information includes the reminding information and
(Continued)

a target geographic area, each reminding device corresponding to the at least one reminding account issues the reminding information when determining that the reminding device meets a preset reminding condition, and the preset reminding condition includes entering the target geographic area.

14 Claims, 13 Drawing Sheets

(51) Int. Cl.
    *H04L 29/08* (2006.01)
    *G06Q 10/10* (2012.01)
    *H04M 1/725* (2006.01)
(58) Field of Classification Search
    USPC ..................................................... 455/456.3
    See application file for complete search history.

(56) References Cited

U.S. PATENT DOCUMENTS

2013/0203442 A1    8/2013  Leblanc et al.
2018/0124564 A1*   5/2018  Phillips et al. ........ H04W 4/021
                                                         455/456.3

OTHER PUBLICATIONS

Machine Translation and Abstract of Chinese Publication No. CN102970654, dated Mar. 13, 2013, 13 pages.
Machine Translation and Abstract of Chinese Publication No. CN103024664, dated Apr. 3, 2013, 26 pages.
Foreign Communication From a Counterpart Application, PCT Application No. PCT/CN2015/100282, English Translation of International Search Report dated Sep. 21, 2016, 2 pages.

* cited by examiner

```
CONT.                    CONT.                    CONT.
FROM                     FROM                     FROM
FIG. 3A                  FIG. 3A                  FIG. 3A
```

S308. The indication device issues a reminder when receiving the message indicating that the reminding device enters the target geographic area S309. The reminding device issues the reminding information when detecting that the reminding device enters the target geographic area S310. The reminding device determines, when detecting that the reminding device leaves the target geographic area, whether the reminding information is confirmed by the user S311. The reminding device sends, to the indication device when the reminding information is confirmed by the user, a message indicating that the reminding information is confirmed S312. The indication device clears a record about the reminding information

FIG. 3B

LOCATION-BASED REMINDING METHOD, INDICATION DEVICE, REMINDING DEVICE, AND MOBILE TERMINAL

CROSS-REFERENCE TO RELATED APPLICATIONS

This application is a national stage of International Application No. PCT/CN2015/100282, filed on Dec. 31, 2015, which is hereby incorporated by reference in its entirety.

TECHNICAL FIELD

The present disclosure relates to the field of electronic technologies, and in particular, to a location-based reminding method, an indication device, a reminding device, and a mobile terminal.

BACKGROUND

With continuous development of electronic technologies, a mobile terminal such as a smartphone and a tablet computer has more functions. Geolocation has become an indispensable function of the mobile terminal. A geo-fencing technology is a new application proposed for the geolocation function, that is, a virtual fence is used to form a geographic area on a map, and a corresponding service may be provided for a user when a mobile terminal enters or leaves the geographic area. A function of a location-based reminder is one of services. The user may select a geo-fence on the mobile terminal, set a size of the geo-fence on the electronic map, and set a reminder. When the user carrying the mobile terminal enters or leaves an area corresponding to the specified geo-fence, the mobile terminal reminds the user of the reminder. For example, when the user enters or leaves a neighboring area of a shop, the mobile terminal reminds the user to buy milk.

However, in the foregoing service, after the user sets the location-based reminder on the mobile terminal, only the mobile terminal can provide the user with the function of the location-based reminder. It can be learned that the service has an undiversified function and poor interactivity.

SUMMARY

Embodiments of the present disclosure provide a location-based reminding method, an indication device, a reminding device, and a mobile terminal, to set a location-based reminder on an indication device for a reminding account, and provide the location-based reminder on a reminding device corresponding to the reminding account. This simplifies user operations, so that functions of a location-based reminder become more diversified, and interactivity of the functions of the location-based reminder is enhanced.

A first aspect of the embodiments of the present disclosure provides a location-based reminding method, including obtaining, by an indication device, reminding information and at least one reminding account that are set by a user, where each reminding account is corresponding to at least one reminding device; generating a first message, where the first message includes the reminding information; and sending the first information to a reminding device corresponding to the at least one reminding account, so that the reminding device corresponding to each reminding account obtains second information according to the first information, where the second information includes the reminding information and a target geographic area, each reminding device issues, after obtaining the second information, the reminding information when determining that the reminding device meets a preset reminding condition, and the preset reminding condition includes entering the target geographic area.

In a first possible implementation of the first aspect, before generating the first information that includes the reminding information, the indication device first determines the target geographic area related to the reminding information. Correspondingly, a specific operation of generating, by the indication device, the first information that includes the reminding information is generating the first information that includes the reminding information and the target geographic area.

With reference to the first possible implementation of the first aspect, in a second possible implementation, before determining the target geographic area related to the reminding information, the indication device first searches a preset electronic map for a target location related to a keyword of the reminding information. Correspondingly, a specific operation of determining, by the indication device, the target geographic area related to the reminding information is determining the target geographic area that includes the target location on the preset electronic map. Optionally, the target geographic area that includes the target location is a geographic area that takes the target location as a center and that takes a specified distance as a radius. The specified distance may be set by the user corresponding to an indication account. Still optionally, the target geographic area that includes the target location is an irregular-pattern geographic area around the target location. The irregular pattern may be defined by the user corresponding to the indication account. It should be noted that, when multiple target locations are found, two methods for determining target geographic areas are as follows. In a method 1, after a target geographic area is determined according to a setting of the user corresponding to the indication account, another target geographic area is determined using a same method. In a method 2, the target geographic areas are determined in sequence according to separate settings of the user corresponding to the indication account.

With reference to the second possible implementation of the first aspect, in a third possible implementation, if the indication device finds, on the preset electronic map, at least two target locations that have a same attribute, where the attribute is related to the keyword of the reminding information, a specific operation of determining, by the indication device, the target geographic area that includes the target location on the preset electronic map is determining at least two target geographic areas on the preset electronic map, where each target geographic area includes one target location. It can be learned that, in this implementation, more target locations can be found, thereby increasing a reminding success ratio.

With reference to any one of the first aspect or the first to the third possible implementations of the first aspect, in a fourth possible implementation, after the indication device sends the first information to the reminding device to which each reminding account is logged in, the indication device receives a message that is sent by a reminding device corresponding to any reminding account and that indicates that the reminding device enters the target geographic area, and then issues the reminding information. It can be learned that, in this implementation, the user corresponding to the indication account can learn the message indicating that a user corresponding to the reminding account enters the target geographic area.

With reference to the fourth possible implementation of the first aspect, in a fifth possible implementation, after receiving the message indicating that the reminding device enters the target geographic area, the indication device determines whether at least two reminding devices enter the target area; and if at least two reminding devices enter the target area, the indication device learns a target reminding account that is selected by the user from at least two reminding accounts, and then sends a notification message to a reminding device corresponding to the target reminding account, where the preset reminding condition further includes receiving the notification message. The reason lies in that, when multiple reminding devices enter the target geographic area, if there is no limitation on the preset reminding condition, each reminding device issues a reminder, and a reminder that needs to be performed only once may be performed many times.

With reference to any one of the first aspect or the first to the fifth possible implementations of the first aspect, in a sixth possible implementation, after sending the first information to the reminding device corresponding to the at least one reminding account, the indication device receives a message that is sent by the reminding device corresponding to each reminding account and that indicates that the reminding information is confirmed, and then clears a record about the reminding information. It can be learned that, in this implementation, storage space of the indication device can be released, and redundant information is reduced.

With reference to any one of the first aspect or the first to the sixth possible implementations of the first aspect, in a seventh possible implementation, the indication device is corresponding to one indication account, and after obtaining the reminding information and the at least one reminding account that are set by the user, the indication device sends the indication account and the at least one reminding account to a cloud server, so that the cloud server establishes a mapping relationship between the indication account and the at least one reminding account. Correspondingly, a specific operation of sending, by the indication device, the first information to the reminding device corresponding to the at least one reminding account is sending the first information to the cloud server, so that the cloud server forwards, according to the mapping relationship, the first information to the reminding device corresponding to the at least one reminding account. Optionally, all interactions between the indication device and each reminding device may be forwarded by the cloud server.

A second aspect of the embodiments of the present disclosure provides a location-based reminding method, including receiving, by a reminding device, first information sent by an indication device, where the first information includes reminding information; obtaining second information according to the first information, where the second information includes the reminding information and a target geographic area; determining whether the reminding device meets a preset reminding condition, where the preset reminding condition includes entering the target geographic area; and issuing the reminding information if the reminding device meets the preset reminding condition.

In a first possible implementation of the second aspect, the first information further includes the target geographic area.

In a second possible implementation of the second aspect, a specific operation of obtaining, by the reminding device, the second information according to the first information is obtaining the reminding information from the first information; determining the target geographic area related to the reminding information; and obtaining the second information that includes the reminding information and the target geographic area.

With reference to the second possible implementation of the second aspect, in a third possible implementation, before determining the target geographic area related to the reminding information, the reminding device first searches a preset electronic map for a target location related to a keyword of the reminding information. Correspondingly, a specific operation of determining, by the reminding device, the target geographic area related to the reminding information is determining the target geographic area that includes the target location on the preset electronic map. Optionally, the target geographic area that includes the target location is a geographic area that takes the target location as a center and that takes a specified distance as a radius. The specified distance may be set by a user corresponding to a reminding account. Still optionally, the target geographic area that includes the target location is an irregular-pattern geographic area around the target location. The irregular pattern may be defined by the user corresponding to the reminding account. It should be noted that, when multiple target locations are found, two methods for determining target geographic areas are as follows. In a method 1, after a target geographic area is determined according to a setting of the user corresponding to the indication account, another target geographic area is determined using a same method. In a method 2, the target geographic areas are determined in sequence according to separate settings of the user corresponding to the indication account.

With reference to the third possible implementation of the second aspect, in a fourth possible implementation, if the reminding device finds, on the preset electronic map, at least two target locations that have a same attribute, where the attribute is related to the keyword of the reminding information, a specific operation of determining, by the reminding device, the target geographic area that includes the target location on the preset electronic map is determining at least two target geographic areas on the preset electronic map, where each target geographic area includes one target location. It can be learned that, in this implementation, more target locations can be found, thereby increasing a reminding success ratio.

With reference to any one of the second aspect or the first to the fourth possible implementations of the second aspect, in a fifth possible implementation, before determining whether the reminding device meets the preset reminding condition, the reminding device sends, to the indication device when detecting that the reminding device enters the target geographic area, a message indicating that the reminding device enters the target geographic area. It can be learned that, in this implementation, the indication device can learn the message indicating that the reminding device enters the target geographic area.

With reference to the fifth possible implementation of the second aspect, in a sixth possible implementation, after sending, to the indication device when detecting that the reminding device enters the target geographic area, the message indicating that the reminding device enters the target geographic area, the reminding device receives a notification message sent by the indication device, where the preset reminding condition further includes receiving the notification message. The reason lies in that, when multiple reminding devices enter the target geographic area, if there is no limitation on the preset reminding condition, each reminding device issues a reminder, and a reminder that needs to be performed only once may be performed many times.

With reference to any one of the second aspect or the first to the sixth possible implementations of the second aspect, in a seventh possible implementation, after issuing the reminder, the reminding device determines, when detecting that the reminding device leaves the target geographic area, whether the reminding information is confirmed by the user; and sends, to the indication device if the reminding information is confirmed by the user, a message indicating that the reminding information is confirmed. It can be learned that, in this implementation, the indication device can learn whether the reminding information is confirmed by the user.

With reference to any one of the second aspect or the first to the seventh possible implementations of the second aspect, in an eighth possible implementation, the indication device is corresponding to one indication account, and the reminding device is corresponding to one reminding account. A specific operation of receiving, by the reminding device, the first information sent by the indication device is receiving, by the reminding device, the first information that is forwarded by the indication device using a cloud server, where the first information is forwarded by the cloud server according to a mapping relationship between the indication account and at least one reminding account, and the at least one reminding account includes the reminding account corresponding to the reminding device. Optionally, all interactions between the indication device and each reminding device may be forwarded by the cloud server.

A third aspect of the embodiments of the present disclosure provides a location-based reminding method, including obtaining, by an indication device, reminding information and a reminding account that are set by a user; determining a target geographic area related to the reminding information; sending the reminding information to a reminding device to which the reminding account is logged in; and sending a first indication message to the reminding device when detecting that the reminding device enters the target geographic area, so that the reminding device issues the reminding information.

In a first possible implementation of the third aspect, before determining the target geographic area related to the reminding information, the indication device first searches a preset electronic map for a target location related to a keyword of the reminding information. Further, a specific operation of determining, by the indication device, the target geographic area related to the reminding information is determining the target geographic area that includes the target location on the preset electronic map.

In a second possible implementation of the third aspect, a specific operation of obtaining, by the indication device, location information of the reminding device is sending a first location request to the reminding device, so that the reminding device obtains first location information of the reminding device and obtains a moving speed and a moving direction of the reminding device in a cellular data positioning manner, and sends the first location information, the moving speed, and the moving direction to the indication device; determining, by the indication device according to the first location information, the moving speed, and the moving direction, a moment of sending a second location request, and sending the second location request to the reminding device at the moment of sending the second location request, so that the reminding device obtains second location information of the reminding device and obtains a moving speed and a moving direction of the reminding device in a wireless local area network positioning manner, and sends the second location information, the moving speed, and the moving direction to the indication device; and determining, by the indication device according to the second location information, the moving speed, and the moving direction, a moment of sending a third location request, and sending the third location request to the reminding device at the moment of sending the third location request, so that the reminding device obtains location information of the reminding device in a Global Positioning System (GPS) positioning manner, and sends the location information to the indication device. In this implementation, when the reminding device is relatively far away from the target geographic area, the first location information of the reminding device is obtained in the most power-saving cellular data positioning manner. When a distance between the reminding device and the target geographic area is moderate, the second location information of the reminding device is obtained in the second most power-saving wireless local area network positioning manner. When the reminding device is relatively close to the target geographic area, the location information of the reminding device is obtained in the least power-saving GPS positioning manner. Equivalently, as a distance increases, a more power-saving positioning manner with lower precision is used, so that power consumption is reduced when a positioning precision requirement is not high.

In a third possible implementation of the third aspect, after sending the first indication message to the reminding device when detecting that the reminding device enters the target geographic area, the indication device further performs the following operation. The indication device sends a second indication message to the reminding device when detecting that the reminding device leaves the target geographic area, so that the reminding device determines whether the reminding information is confirmed by the user. Further, the indication device clears a record about the reminding information and the target geographic area when receiving a message indicating that the reminding information is confirmed.

A fourth aspect of the embodiments of the present disclosure provides a location-based reminding method, including receiving, by a reminding device, reminding information sent by an indication device; sending location information of the device to the indication device; and issuing the reminding information when receiving a first indication message sent by the indication device.

In a first possible implementation of the fourth aspect, after issuing the reminding information when receiving the first indication message sent by the indication device, the reminding device further performs the following operations. When receiving a first location request sent by the indication device, the reminding device obtains first location information of the device and obtains a moving speed and a moving direction of the device in a cellular data positioning manner, and sends the first location information, the moving speed, and the moving direction to the indication device. In this implementation, the cellular data positioning manner is used, so that power consumption can be reduced when a positioning precision requirement is not high.

With reference to the first possible implementation of the fourth aspect, in a second possible implementation, after sending the first location information, the moving speed, and the moving direction to the indication device, the reminding device further performs the following operations. When receiving a second location request sent by the indication device, the reminding device obtains second location information of the device and obtains a moving speed and a moving direction of the device in a wireless local area network positioning manner, and sends the second location information, the moving speed, and the moving direction to the indication device. In this implementation, the wireless local area network positioning manner is used, so that power consumption can be reduced when a positioning precision requirement is moderate.

With reference to the second possible implementation of the fourth aspect, in a third possible implementation, after sending the second location information, the moving speed, and the moving direction to the indication device, the reminding device further performs the following operations. When receiving a third location request sent by the indication device, the reminding device obtains location information of the device in a GPS positioning manner, and sends the location information to the indication device.

With reference to the third possible implementation of the fourth aspect, in a fourth possible implementation, after issuing the reminding information when receiving the first indication message sent by the indication device, the reminding device further performs the following operations. The reminding device determines, when receiving a second indication message sent by the indication device, whether the reminding information is confirmed by a user; and sends, to the indication device when determining that the reminding information is confirmed, a message indicating that the reminding information is confirmed.

A fifth aspect of the embodiments of the present disclosure provides a location-based reminding method, including obtaining, by an indication device, reminding information, a reminding account, and a reminding distance that are set by a user; obtaining location information of the device; and sending the reminding account, the reminding distance, and the location information to a monitoring device, so that the monitoring device sends an indication message to the indication device when detecting that a distance between the indication device and a reminding device to which the reminding account is logged in exceeds the reminding distance, and the indication device issues the reminding information when receiving the indication message.

In a first possible implementation of the fifth aspect, after obtaining the reminding information, the target reminding account, and the reminding distance that are set by the user, the indication device further performs the following operation. The indication device sends the reminding information to the monitoring device, so that the monitoring device issues the reminding information when detecting that the distance between the indication device and the reminding device to which the reminding account is logged in exceeds the reminding distance.

A sixth aspect of the embodiments of the present disclosure provides a location-based reminding method, including receiving, by a monitoring device, a reminding account, a reminding distance, and location information of an indication device that are sent by the indication device; obtaining location information of a reminding device to which the reminding account is logged in; detecting a distance between the indication device and the reminding device according to the location information of the indication device and the location information of the reminding device; and sending, by the monitoring device, an indication message to the indication device when detecting that the distance between the indication device and the reminding device exceeds the reminding distance, so that the indication device issues reminding information.

In a first possible implementation of the sixth aspect, the monitoring device further receives the reminding information sent by the indication device, and issues the reminding information when detecting that the distance between the indication device and the reminding device exceeds the reminding distance.

In a first possible implementation of the sixth aspect, a specific operation of obtaining, by the monitoring device, the location information of the reminding device is sending, by the monitoring device to the reminding device, a message for requesting the location information, so that the reminding device obtains the location information of the reminding device and sends the location information of the reminding device to the monitoring device; and receiving, by the monitoring device, the location information.

A seventh aspect of the embodiments of the present disclosure provides a location-based reminding method, and the method includes obtaining, by an indication device, reminding information and an identifier of at least one reminding device that are set by a user; and generating, by the indication device, first information that includes the reminding information, and sending the first information to a reminding device corresponding to the identifier of the at least one reminding device, so that the reminding device receiving the first information obtains second information according to the first information, where the second information includes the reminding information and a target geographic area, the reminding device receiving the first information issues the reminding information when determining that the reminding device meets a preset reminding condition, and the preset reminding condition includes entering the target geographic area.

First, second, and third possible implementations of the seventh aspect are respectively the same as the first, second, and third possible implementations of the first aspect. Details are not repeatedly described herein.

With reference to any one of the seventh aspect or the first to the third possible implementations of the seventh aspect, in a fourth possible implementation, after the indication device sends the first information to the reminding device, the indication device receives a message that is sent by the reminding device receiving the first information and that indicates that the reminding device enters the target geographic area, and then issues the reminding information. It can be learned that, in this implementation, the user corresponding to the identifier of the reminding device can learn the message indicating that the reminding device enters the target geographic area.

With reference to the fourth possible implementation of the seventh aspect, in a fifth possible implementation, after receiving the message indicating that the reminding device enters the target geographic area, the indication device determines whether at least two reminding devices enter the target area; and if at least two reminding devices enter the target area, the indication device learns a target reminding device that is selected by the user from the at least two reminding devices, and then sends a notification message to the target reminding device, where the preset reminding condition further includes receiving the notification message. The reason lies in that, when multiple reminding devices enter the target geographic area, if there is no limitation on the preset reminding condition, each reminding device issues a reminder, and a reminder that needs to be performed only once may be performed many times.

With reference to any one of the seventh aspect or the first to the fifth possible implementations of the seventh aspect, in a sixth possible implementation, after sending the first information to the reminding device corresponding to the identifier of the at least one reminding device, the indication device receives a message that is sent by the reminding device receiving the first information and that indicates that the reminding information is confirmed, and then clears a record about the reminding information. It can be learned that, in this implementation, storage space of the indication device can be released, and redundant information is reduced.

An eighth aspect of the embodiments of the present disclosure provides an indication device, and the device has a function for implementing an action in the method provided in the first aspect. The function may be implemented using hardware, or may be implemented by hardware by executing corresponding software. The hardware or the software includes one or more modules corresponding to the function.

A ninth aspect of the embodiments of the present disclosure provides a reminding device, and the device has a function for implementing an action in the method provided in the second aspect. The function may be implemented using hardware, or may be implemented by hardware by executing corresponding software. The hardware or the software includes one or more modules corresponding to the function.

A tenth aspect of the embodiments of the present disclosure provides a mobile terminal, where the mobile terminal includes an input interface, a processor, a communications interface, an output interface, a locator, a memory, and a power supply. The input interface, the processor, the communications interface, the output interface, the locator, the memory, and the power supply cooperate with each other, to implement the method provided in the first aspect and the method provided in the second aspect.

It can be learned from the foregoing description that, according to the methods provided in the embodiments of the present disclosure, the user A sets the reminding information and the reminding account on the indication device; the indication device sends the reminding information set by the user A to the reminding device corresponding to each reminding account; and after obtaining the reminding information and the target geographic area, the reminding device may issue the reminding information after the reminding device enters the target geographic area or after the reminding device enters the target geographic area and meets another condition, so that the user B carrying or using the reminding device can obtain the location-based reminder. In addition, neither the user A nor the user B needs to additionally set the reminding information on the reminding device. Therefore, in the embodiments of the present disclosure, user operations are simplified, functions of a location-based reminder become more diversified, and interactivity is more desirable.

BRIEF DESCRIPTION OF DRAWINGS

To describe the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

FIG. 3A and FIG. 3B are a schematic flowchart of still another location-based reminding method according to an embodiment of the present disclosure;

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 10:
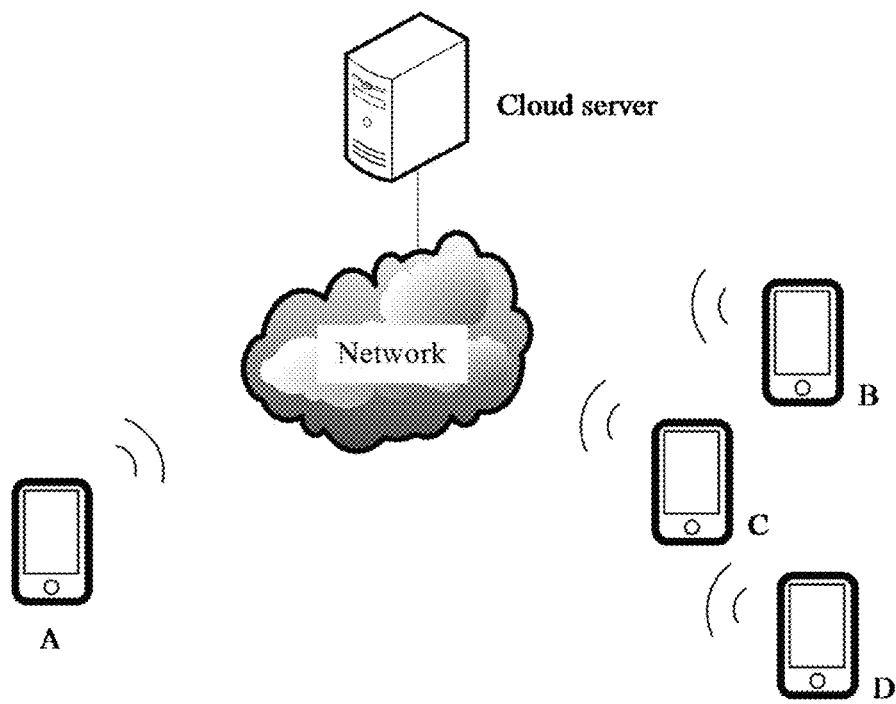
FIG. 10 is a schematic diagram of a scenario in which location-based reminding is performed according to an embodiment of the present disclosure.

For ease of understanding, an application scenario of the embodiments of the present disclosure is first described herein. Referring to FIG. 10, in the application scenario of the embodiments of the present disclosure, an indication device (a device A shown in the figure) and at least one reminding device (devices B, C and D shown in the figure) are included. The indication device and the reminding device may communicate with each other, and the reminding devices may also communicate with each other.

It should be noted that, an account in the embodiments of the present disclosure is registered by a user for logging in to or using a mobile terminal. For example, the account may be an Apple ID, an e-mail account, or an identifier of a user identity card.

In the embodiments of the present disclosure, a process in which one party issues a reminder and the other party accepts the reminder is described. An account that issues the reminder is an indication account, and an account that accepts the reminder is a reminding account. The indication account is corresponding to the indication device, the indication account may be corresponding to at least one indication device, and the indication device may also be corresponding to at least one indication account. A device to which the indication account is logged in may be referred to as the indication device, or a device that is bound to the indication account may be referred to as the indication device. Similarly, the reminding account is corresponding to the reminding device, the reminding account may be corresponding to at least one reminding device, and the reminding device may also be corresponding to at least one reminding account. A device to which the reminding account is logged in may be referred to as the reminding device, or a device that is bound to the reminding account may be referred to as the reminding device. The foregoing two binding relationships may be set by a user or may be set by a telecommunications operator according to a user's requirement. This is not limited in the present disclosure.

Both the indication device and the reminding device are mobile terminals. The mobile terminal includes a smartphone, a tablet computer, a smart wearable device (such as a smartwatch, smart glasses, and a smart band), a notebook computer, a digital audio/video player, an e-reader, a handheld game console, an in-vehicle electronic device, and the like. The mobile terminal has functions such as running an application (APP), communication, and positioning.

Optionally, referring to FIG. 10, in the application scenario of the embodiments of the present disclosure, a cloud server may be further included. The cloud server is a device that has functions such as processing information, storing information, and forwarding a message and that is located in a network. Further, the indication device and the reminding device may directly communicate with each other, for example, perform near field communication. Alternatively, the indication device and the reminding device may communicate with each other using the cloud server.

In the embodiments of the present disclosure, to improve security and protect user privacy, the indication device may set a location-based reminder for the reminding device on the premise that a trust relationship is established between the indication account and the reminding account or a trust relationship is established between the indication device and the reminding device. For example, a process in which the trust relationship is established between the indication account and the reminding account is as follows. After a user A logs in to an account on an indication device, the indication device accesses a cloud server using the account of the user A. When obtaining multiple invitees (for example, an account of a user B, an account of a user C, and an account of a user D) set by the user A, the indication device invites the multiple accounts using the account of the user A as an initiator of the "trust relationship". After the users log in to the accounts on respective reminding devices, the reminding devices access the cloud server using the respective accounts. When obtaining confirmation instructions entered by the user B, the user C, and the user D for "trust relationship" invitations, the reminding devices accept the invitations using the accounts as invitees of the "trust relationship". In this case, the "trust relationship" is established between the account of the user A and the accounts. The trust relationship may be stored in a device corresponding to an account for which the trust relationship is established, or may be stored on the cloud server.

In the embodiments of the present disclosure, reminding information is content set by a user for reminding, and may be a voice message, a text message, or the like.

In the embodiments of the present disclosure, a monitoring device is a device that has functions such as processing information, storing information, and receiving and transmitting a message and that can communicate with the indication device and the reminding device, for example, a wireless router, a small cell, or a femtocell; for another example, a smartphone, a tablet computer, a smart wearable device (such as a smartwatch, smart glasses, and a smart band), a notebook computer, a digital audio/video player, an e-reader, a handheld game console, or an in-vehicle electronic device. The monitoring device is mainly configured to monitor a distance between the indication device and the reminding device.

Figure 8:
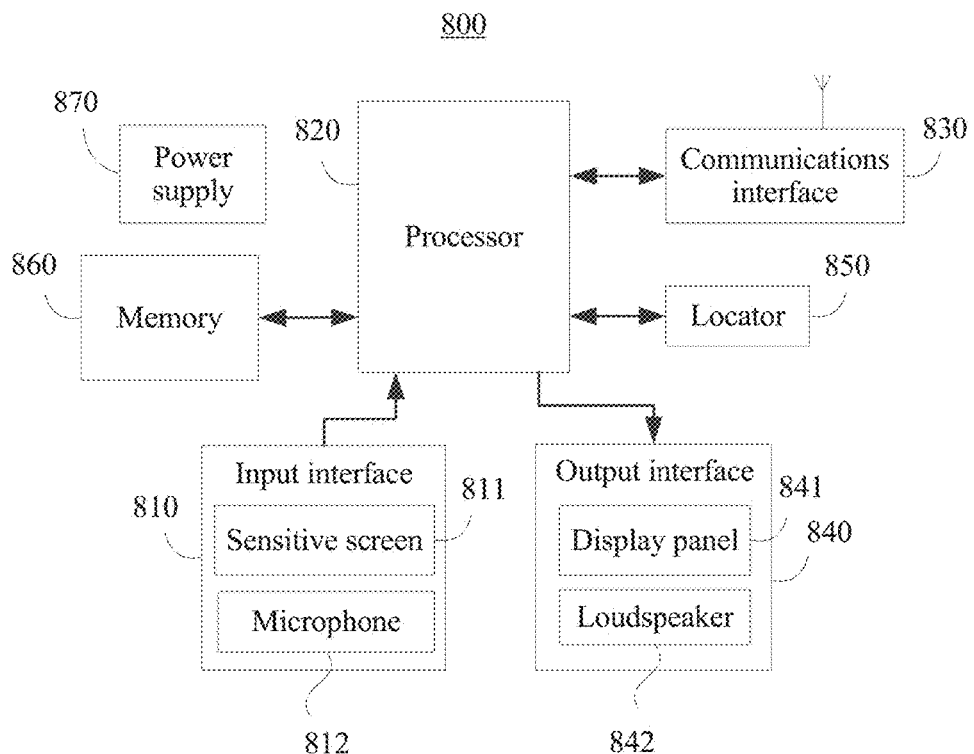
FIG. 8 is a schematic structural diagram of a mobile terminal according to an embodiment of the present disclosure.

In the embodiments of the present disclosure, a structure of the mobile terminal may be shown in FIG. 8, and the mobile terminal includes an input interface 810, a processor 820, a communications interface 830, an output interface 840, a locator 850, a memory 860, and a power supply 870. The input interface 810 may be a sensitive screen 811 and a microphone 812 and is configured to obtain an instruction entered by a user, or may be another component that can obtain an instruction entered by a user, for example, a physical button, a camera, or a distance sensor. The communications interface 830 may be a WiFi module, a Global System for Mobile Communication (GSM) module, a Bluetooth module, or the like, and is configured to communicate with another device. The output interface 840 may be a display panel 841 and a loudspeaker 842 and is configured to remind the user, or may be another component that can remind the user, for example, a headset, a vibration motor, or a signal light. The locator 850 may be a GPS module, a GSM module, a WiFi module, or the like, and is configured to obtain location information. The memory 860 may be a high-speed random access memory (RAM) memory, or may be a nonvolatile memory (non-volatile memory), for example, at least one magnetic disk memory. The memory 860 may store program code, to instruct the processor 820 to perform a corresponding operation. The power supply 870 is configured to supply power to the mobile terminal.

Figure 9:
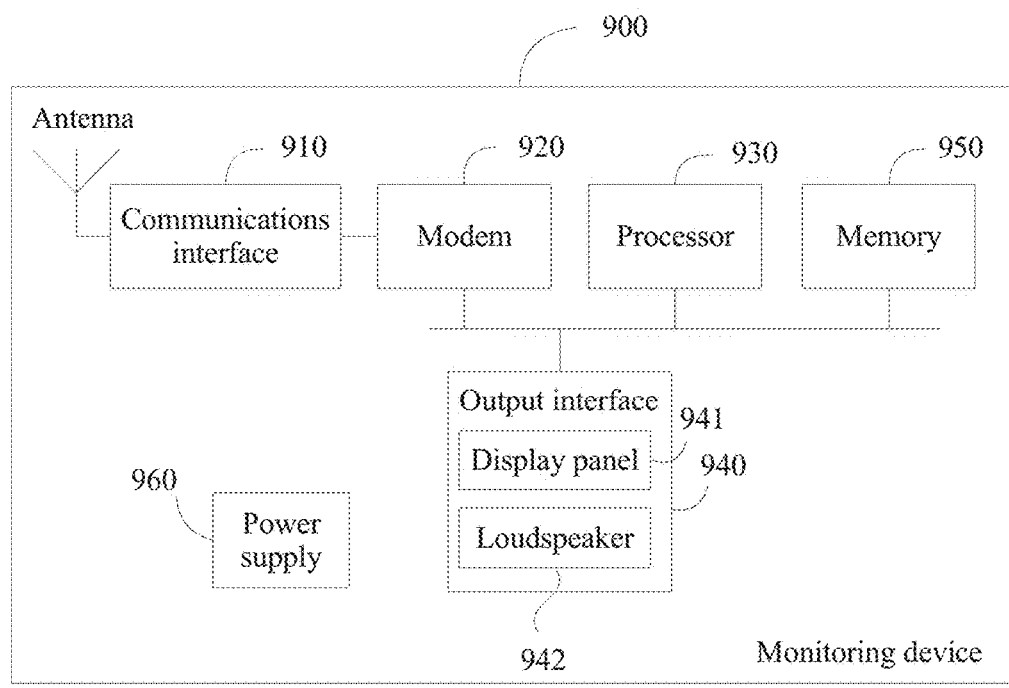
FIG. 9 is a schematic structural diagram of a monitoring device according to an embodiment of the present disclosure.

In the embodiments of the present disclosure, a structure of the monitoring device may be shown in FIG. 9, and the monitoring device includes a communications interface 910, a modem 920, a processor 930, an output interface 940, a memory 950, and a power supply 960. The communications interface 910 may be another component such as an antenna that can receive and transmit a radio frequency signal, and is configured to communicate with another device. The modem 920 is configured to demodulate a radio frequency signal to an analog signal or modulate an analog signal to a radio frequency signal. The output interface 940 may be a display panel 941 and a loudspeaker 942 and is configured to remind a user, or may be another component that can remind a user, for example, a headset or a signal light. The memory 950 may be a high-speed RAM memory, or may be a nonvolatile memory, for example, at least one magnetic disk memory. The memory 950 may store program code, to instruct the processor 930 to perform a corresponding operation. The power supply 960 is configured to supply power to the monitoring device.

Figure 1A:
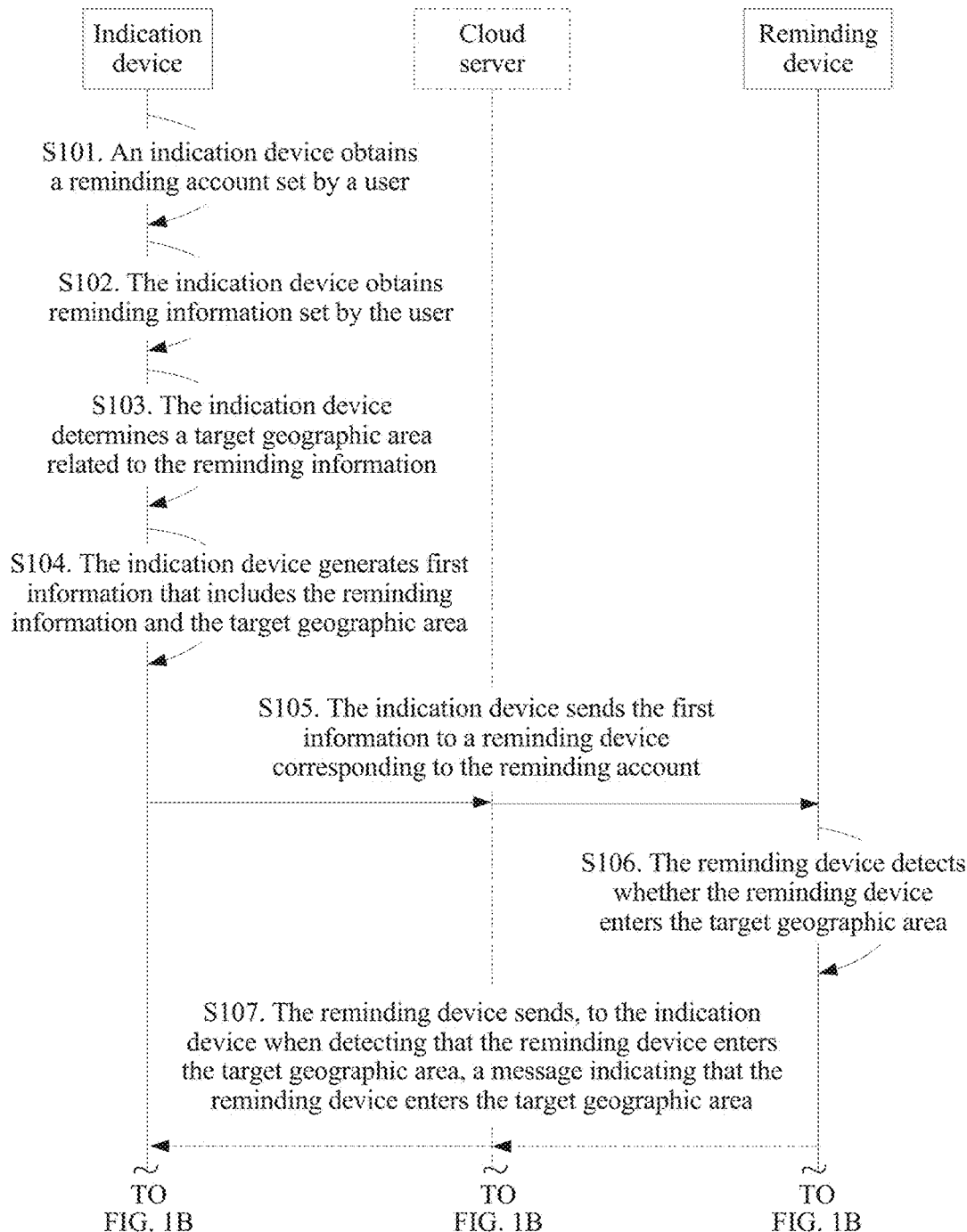
FIG. 1A and FIG. 1B are a schematic flowchart of a location-based reminding method according to an embodiment of the present disclosure.
Figure 1B:
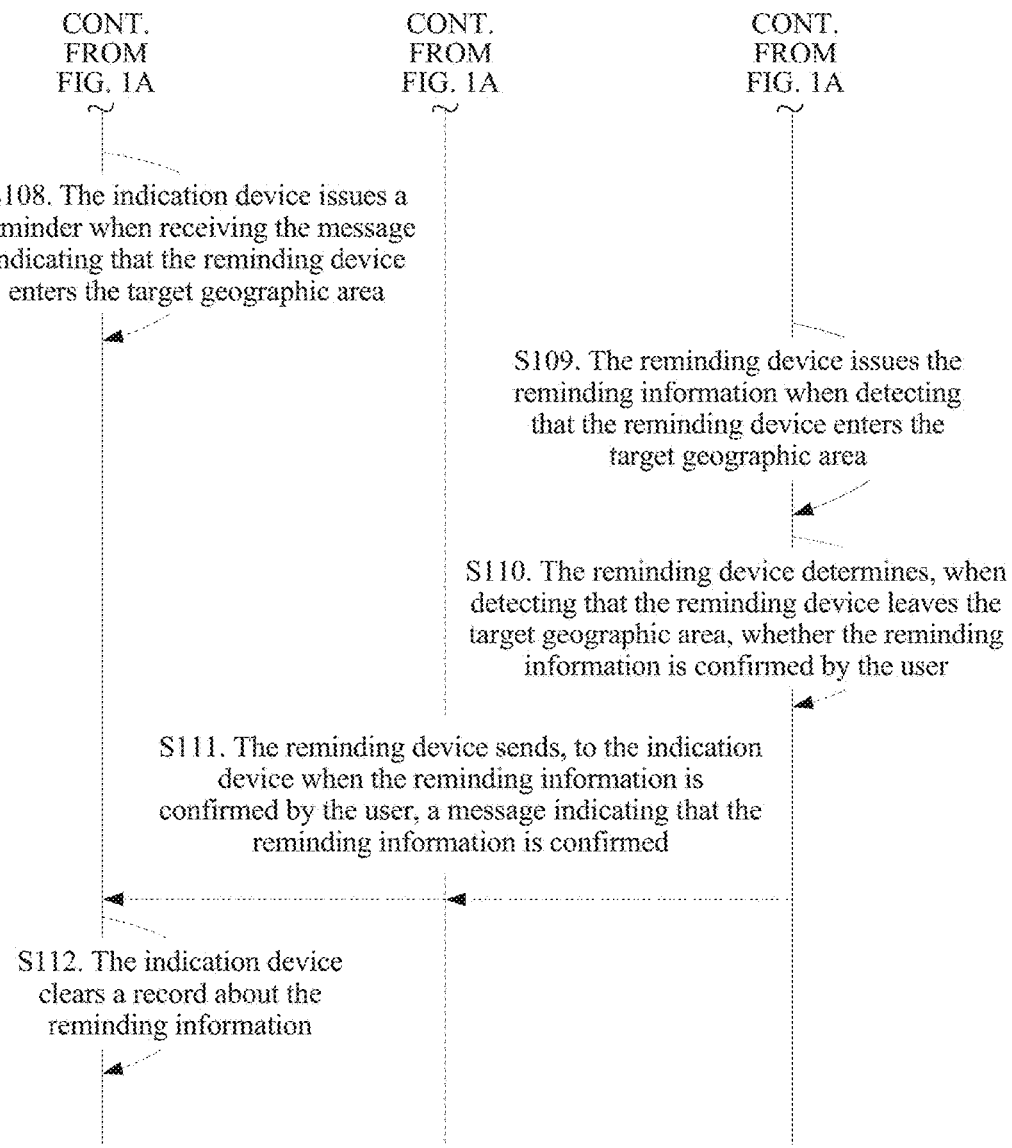

FIG. 1A and FIG. 1B are a schematic flowchart of a location-based reminding method according to an embodiment of the present disclosure. As shown in the figure, a procedure of the location-based reminding method in this embodiment may include the following steps.

S101. An indication device obtains a reminding account set by a user.

An input interface 810 of the indication device obtains the reminding account set by the user. Optionally, the user sets the reminding account in multiple manners. The user may set the reminding account by editing a text, by inputting a voice, or by selecting the reminding account from a list. For example, an output interface 830 of the indication device displays a list including a "user B", a "user C", and a "user D", and after the user selects the "user B", the input interface

810 of the indication device uses an account corresponding to the "user B" as the reminding account set by the user.

Further, a communications interface 830 of the indication device sends an indication account and the reminding account to a cloud server, so that the cloud server stores a mapping relationship between the indication account and the reminding account. For example, a specific process is as follows. After the user A logs in to an account on the indication device, the indication device accesses the cloud server using the indication account (that is, the account of the user A). When obtaining the reminding account (for example, the account of the user B) set by the user A, the indication device invites the account of the user B using the account of the user A as an initiator of a "trust relationship". After the user B logs in to the account on a reminding device, the reminding device accesses the cloud server using the account of the user B. When obtaining a confirmation instruction entered by the user B for a "trust relationship" invitation, the reminding device accepts the invitation using the account of the user B as an invitee of the "trust relationship". In this case, the "trust relationship" is established between the account of the user A and the account of the user B, and the cloud server stores the "trust relationship". Then, the indication device may set a location-based reminder for the reminding device.

Optionally, the indication device may directly communicate with a reminding device using a communications interface 830 without a cloud server. In this manner, the indication device does not need to send an indication account and the reminding account to the cloud server. For example, a specific process is as follows. After the user A logs in to an account on the indication device, the indication device directly sends an invitation to the indication device using the account of the user A as an initiator of a "trust relationship". After the user B logs in to the account on the reminding device, when the reminding device obtains a confirmation instruction entered by the user B for a "trust relationship" invitation, the reminding device accepts the invitation using the account of the user B as an invitee of the "trust relationship". In this case, the "trust relationship" is established between the account of the user A and the account of the user B, and the indication device and the reminding device store the "trust relationship" in the respective devices. Then, the indication device may set a location-based reminder for the reminding device.

S102. The indication device obtains reminding information set by the user.

The input interface 810 of the indication device obtains the reminding information set by the user A.

Optionally, the user A sets the reminding information in multiple manners. The user A may set the reminding information by editing a text, for example, editing a text "Go to a supermarket to buy milk". Alternatively, the user A may set the reminding information by selecting a preset text template, for example, selecting a preset text template "Go to a payment office to pay for water and electricity". Alternatively, the user A may set the reminding information by inputting a voice, for example, inputting a voice "Go to a guard room to get a parcel". This is not limited herein.

S103. The indication device determines a target geographic area related to the reminding information.

In an implementation, the reminding information includes a location phrase such as "supermarket", "payment office", "business hall", or "guard room". A processor 820 of the indication device searches a preset electronic map for a target location related to a keyword of the reminding information, and then determines the target geographic area that includes the target location on the preset electronic map. The preset electronic map is an electronic map of a preset range around a place at which the indication device is currently located. The preset range is preset by a mobile device manufacturer or the user A, and a specific value of the preset range is not limited. For example, the preset electronic map is an electronic map of one kilometer around the place at which the indication device is currently located. In addition, a method for extracting the keyword of the reminding information by the processor 820 of the indication device may be as follows. The processor 820 of the indication device extracts, from the reminding information, a phrase recorded in a preset phrase library, and uses the phrase as the keyword. The preset phrase library is pre-established by the mobile device manufacturer. The preset phrase library records a frequently used location phrase such as "supermarket", "payment office", "business hall", or "guard room". In addition, a method for searching, by the processor 820 of the indication device, the target location related to the keyword of the reminding information may be as follows. The processor 820 of the indication device finds a location whose name includes the keyword of the reminding information, and uses the location as the target location. For example, assuming that reminding information is "Go to a supermarket to buy milk" and a preset phrase library records "supermarket", a keyword extracted by the indication device from the reminding information is "supermarket". Then, the indication device finds, on an electronic map, a target location "supermarket X" whose name includes "supermarket", and determines a target geographic area that includes the "supermarket X" on the electronic map.

It should be noted that the target geographic area on the electronic map may be in any shape provided that the target geographic area includes the target location. Preferably, the target geographic area is a circular area that takes the target location as a center and that takes a specified distance as a radius. The specified distance may be set by the user A, for example, 10 meters. The setting may be obtained by the input interface 810 of the indication device. Certainly, the target geographic area may be in another shape or in an irregular shape. For example, assuming that the target location found on the electronic map is "supermarket X", the indication device uses, as the target geographic area, a circular area that takes the "supermarket X" as a center and that takes 10 meters as a radius.

It should be further noted that, multiple target locations may be found. In this case, two methods for determining target geographic areas are as follows. In a method 1, after a target geographic area is determined according to a setting of the user A, another target geographic area is determined using a same method. In a method 2, the target geographic areas are determined in sequence according to separate settings of the user A.

Further, if the indication device finds, on the preset electronic map, at least two target locations that have a same attribute, where the attribute is related to the keyword of the reminding information, the processor 820 of the indication device determines multiple target geographic areas on the preset electronic map. Each target geographic area includes one target location. In this implementation, each location on the electronic map is marked with at least one attribute in advance by a provider of the electronic map or an application providing a map service or the mobile terminal. For example, locations such as a supermarket, a convenience store, and a bakery are marked with an attribute "food store" in advance.

In a specific implementation process, the processor 820 of the indication device determines an attribute related to the keyword of the reminding information, for example, determines that an attribute related to a keyword "supermarket" is "food store"; finds, on the preset electronic map, at least two locations marked with this attribute, for example, "supermarket X", "convenience store Y", and "bakery Z"; and determines at least two target geographic areas on the preset electronic map. Each target geographic area includes one target location. For example, a target geographic area includes the "supermarket X", a target geographic area includes the "convenience store Y", and a target geographic area includes the "bakery Z".

In another implementation, the reminding information does not include a location phrase, but includes event information. In addition, the target geographic area related to the event information may be directly entered or selected by the user. A preset electronic map pops up using the output interface 830 of the indication device, and the user A selects a target location from the electronic map and sets a geographic area that includes the target location. Then, the input interface 810 of the indication device obtains the geographic area set by the user A. The processor 820 of the indication device determines the geographic area as the target geographic area related to the reminding information. For example, the user A sets reminding information "Buy milk"; a preset electronic map pops up on the indication device; and the user A finds, on the electronic map, a target location "supermarket X" in which milk is sold, and sets a geographic area that includes the "supermarket X". In this case, the indication device determines the geographic area that includes the "supermarket X" as the target geographic area related to the reminding information.

S104. The indication device generates first information that includes the reminding information and the target geographic area.

The processor 820 of the indication device generates the first information that includes the reminding information and the target geographic area.

S105. The indication device sends the first information to a reminding device corresponding to the reminding account.

It should be noted that, before step S105, the user B logs in to the reminding account on the reminding device.

The communications interface 830 of the indication device sends the first information to the cloud server. The cloud server finds, according to the mapping relationship, the reminding account to which the indication account is mapped, and then forwards the first information to the reminding device corresponding to the reminding account. If the reminding account is corresponding to N reminding devices, where N is an integer greater than 1, the cloud server forwards the first information to all or some of the N reminding devices. The user may set, using the indication device or the reminding device, which reminding device the first information is forwarded to. A specific implementation of the setting is not limited in the present disclosure.

Optionally, if the indication device directly communicates with the reminding device, the communications interface 830 of the indication device directly sends the first information to the reminding device.

Correspondingly, a communications interface 830 of the reminding device receives the first information.

S106. The reminding device detects whether the reminding device enters the target geographic area.

Figure 11:
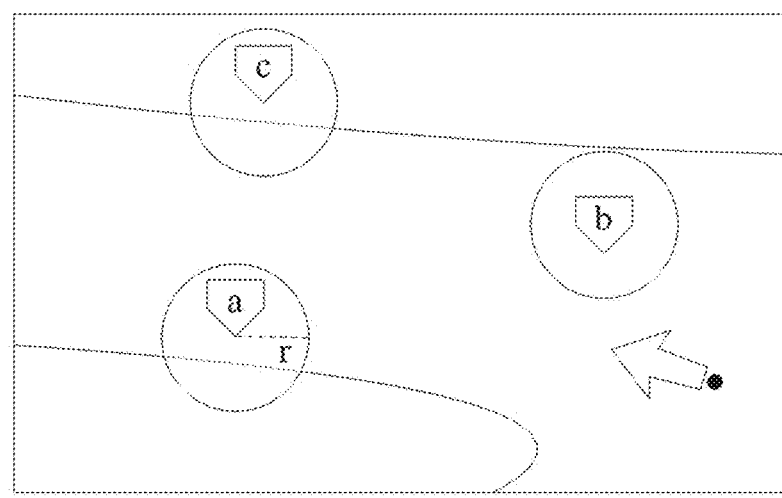
FIG. 11 is a schematic diagram of an electronic map according to an embodiment of the present disclosure.

A processor 820 of the reminding device determines the target geographic area on the electronic map, detects, according to a real-time location of the device on the electronic map, whether the device enters the target geographic area, and may display the real-time location of the device using an output interface 840. For example, referring to FIG. 11, a dark point indicates the real-time location of the reminding device on the electronic map, and an arrow indicates a moving direction of the reminding device. With movement of the reminding device, the dark point moves on the electronic map. When the dark point enters any circle, it is determined that the device enters the target geographic area.

S107. The reminding device sends, to the indication device when detecting that the reminding device enters the target geographic area, a message indicating that the reminding device enters the target geographic area.

Because the reminding account of the user B is logged in to the reminding device, a location of the user B may be determined according to the location of the reminding device. When the reminding device detects, using a locator 850 and the processor 820, that the device enters the target geographic area, the communications interface 830 of the reminding device sends, to the cloud server, the message indicating that the reminding device or the user B enters the target geographic area. Then, the cloud server finds, according to the mapping relationship, the indication account to which the reminding account is mapped, and sends, to the indication device corresponding to the indication account, the message indicating that the reminding device or the user B enters the target geographic area.

Optionally, if the indication device directly communicates with the reminding device, the communications interface 830 of the reminding device directly sends, to the reminding device, the message indicating that the user B enters the target geographic area.

S108. The indication device issues a reminder when receiving the message indicating that the reminding device enters the target geographic area.

The output interface 840 of the indication device issues the reminder in multiple manners, for example, displays the reminder using a screen, or plays the reminder in voice, provided that a reminding effect can be achieved. This is not limited herein. For example, the indication device rings and displays "The user B arrives in the vicinity of a supermarket" in a pop-up window. For another example, the indication device plays "The user B arrives in the vicinity of a supermarket" in voice.

It should be noted that, S107 and S108 are optional steps in this embodiment of the present disclosure. Performing these steps brings the following advantages. The user A can learn the message indicating that the user B enters the target geographic area, and the user A can select, according to a requirement of the user A, whether to perform a reminding operation of making a call or sending a message. Optionally, after receiving the message indicating that the reminding device enters the target geographic area, the indication device may automatically display an option or a user interface of dialing or sending a message, so that the user A performs a further operation.

S109. The reminding device issues the reminding information when detecting that the reminding device enters the target geographic area.

The output interface 840 of the reminding device issues the reminding information in multiple manners, for example, displays the reminding information using a screen, or plays the reminding information in voice, provided that a reminding effect can be achieved. This is not limited herein. For example, the reminding device rings and displays "Go to a supermarket to buy milk" in a pop-up window. For another example, the reminding device plays "Go to a supermarket to buy milk" in voice.

S110. The reminding device determines, when detecting that the reminding device leaves the target geographic area, whether the reminding information is confirmed by the user.

When detecting, using the locator 850 and the processor 82, that the real-time location of the device on the electronic map is outside the target geographic area, the reminding device asks, using the output interface 840 and an input interface 810, the user B whether a reminder corresponding to the reminding information is completed.

Likewise, whether the reminder corresponding to the reminding information is completed is asked in multiple manners, for example, displayed using a screen, or asked in voice, provided that a reminding effect can be achieved. This is not limited herein. For example, an option box is displayed in a pop-up window, content of the option box is "Have you bought the milk?", and two options "Yes" and "No" are set. When the user B clicks "Yes", the processor 820 of the reminding device determines that the reminding information is confirmed. When the user B clicks "No" or does not click an option during a preset time period, the processor 820 of the reminding device determines that the reminding information is not confirmed by the user B. For another example, "Have you bought the milk?" is asked in voice. When the user B answers "Yes", the processor 820 of the reminding device determines that the reminding information is confirmed. When the user B answers "No" or does not respond during a preset time period, the processor 820 of the reminding device determines that the reminding information is not confirmed.

S111. The reminding device sends, to the indication device when the reminding information is confirmed by the user, a message indicating that the reminding information is confirmed.

The communications interface 830 of the reminding device sends, to the cloud server when the reminding information is confirmed by the user, the message indicating that the reminding information is confirmed. Then, the cloud server finds, according to the mapping relationship, the indication account to which the reminding account is mapped, and sends, to the indication device corresponding to the indication account, the message indicating that the reminding information is confirmed.

Optionally, if the indication device directly communicates with the reminding device, the communications interface 830 of the reminding device directly sends, to the reminding device, the message indicating that the reminding information is confirmed.

Correspondingly, the communications interface 830 of the indication device receives the message indicating that the reminding information is confirmed.

S112. The indication device clears a record about the reminding information.

The processor 820 of the indication device clears the record about the reminding information.

It should be noted that, S111 to S114 in this embodiment of the present disclosure are optional steps. Performing these steps brings the following advantage. The indication device may clear the record about the reminding information when learning that the reminding information is confirmed by the user, to release storage space and reduce redundant information.

It can be learned from the foregoing description that, in this embodiment of the present disclosure, the user sets the reminding information and the reminding account on the indication device; the indication device sends the reminding information set by the user to the reminding device corresponding to the reminding account; and after obtaining the reminding information and the target geographic area, the reminding device may issue the reminding information after entering the target geographic area, so that the user carrying or using the reminding device can obtain the location-based reminder, and neither the user A setting the reminding message nor the user B carrying or using the reminding device needs to additionally set the reminding information on the reminding device. Therefore, in this embodiment of the present disclosure, user operations are simplified, functions of a location-based reminder become more diversified, and interactivity is more desirable.

In this embodiment of the present disclosure, the indication device may set the location-based reminder for the reminding device on the premise that a trust relationship is established between an identifier of the indication device and an identifier of the reminding device. The identifier of the device may be information such as a character, a number, or a pattern that uniquely identifies the device. For example, a process in which the trust relationship is established between the identifier of the indication device and the identifier of the reminding device is as follows. It is assumed that the identifier of the indication device is an identifier A and the identifier of the reminding device is an identifier B. The indication device accesses the cloud server using the identifier A. When obtaining an invitee (that is, the identifier B) set by the user A, the indication device invites the identifier B using the identifier A as an initiator of the "trust relationship". The reminding device accesses the cloud server using the identifier B. When obtaining a confirmation instruction entered by the user for a "trust relationship" invitation, the reminding device accepts the invitation using the identifier B as the invitee of the "trust relationship". In this case, the "trust relationship" is established between the identifier A and the identifier B. The trust relationship may be stored in a device corresponding to an identifier for which the trust relationship is established, or may be stored on the cloud server.

It should be noted that the embodiment corresponding to FIG. 1A and FIG. 1B is a method described for a case in which "the indication device may set the location-based reminder for the reminding device on the premise that the trust relationship is established between the account of the indication device and the account of the reminding device". A method procedure of an embodiment corresponding to a case in which "the indication device may set the location-based reminder for the reminding device on the premise that the trust relationship is established between the identifier of the indication device and the identifier of the reminding device" may be the same as that of the embodiment corresponding to FIG. 1A and FIG. 1B. Details are not repeatedly described. Differences are described in detail herein.

In step S101, an indication device obtains an identifier, set by a user, of a reminding device.

An input interface 810 of the indication device obtains the identifier, set by the user, of the reminding device.

Further, a communications interface 830 of the indication device sends an identifier of the indication device and the identifier of the reminding device to a cloud server, so that the cloud server stores a mapping relationship between the identifier of the indication device and the identifier of the reminding device.

Optionally, the indication device may directly communicate with the reminding device using a communications interface 830 without a cloud server. In this manner, the indication device and the reminding device directly establish the mapping relationship between the identifier of the indication device and the identifier of the reminding device, and store the mapping relationship in the respective devices.

In step S105, the indication device sends the first information to the reminding device corresponding to the identifier of the reminding device.

The communications interface 830 of the indication device sends the first information to the cloud server. The cloud server finds, according to the mapping relationship, the reminding device corresponding to the identifier of the reminding device, and then forwards the first information to the reminding device.

Optionally, if the indication device directly communicates with the reminding device, the communications interface 830 of the indication device directly sends the first information to the reminding device corresponding to the identifier of the reminding device.

In step S105, when the reminding device detects, using a locator 850 and a processor 820, that the device enters the target geographic area, a communications interface 830 of the reminding device sends, to the cloud server, a message indicating that the reminding device enters the target geographic area. Then, the cloud server finds the identifier of the indication device according to the mapping relationship, and sends, to the indication device corresponding to the identifier of the indication device, the message indicating that the reminding device enters the target geographic area.

In step S111, the communications interface 830 of the reminding device sends, to the cloud server, a message indicating that the reminding information is confirmed. Then, the cloud server finds the identifier of the indication device according to the mapping relationship, and sends, to the indication device corresponding to identifier of the indication device, the message indicating that the reminding information is confirmed.

In conclusion, in steps S101 to S112, the user does not need to log in to an account on any device. Therefore, the indication device and the reminding device may perform none of operations related to an account, and the indication device and the reminding device may not be limited by descriptions related to account login.

Figure 2A:
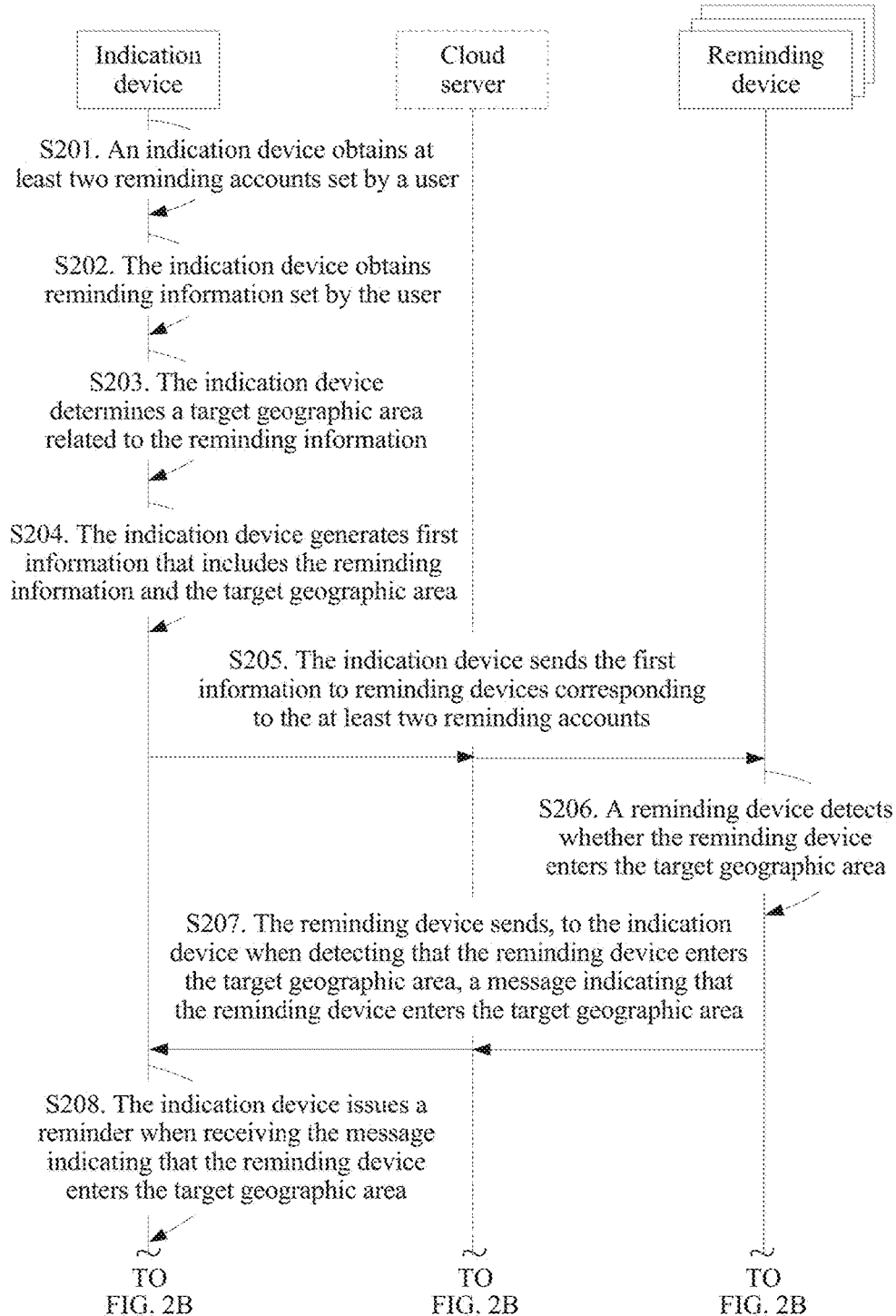
FIG. 2A and FIG. 2B are a schematic flowchart of another location-based reminding method according to an embodiment of the present disclosure.
Figure 2B:
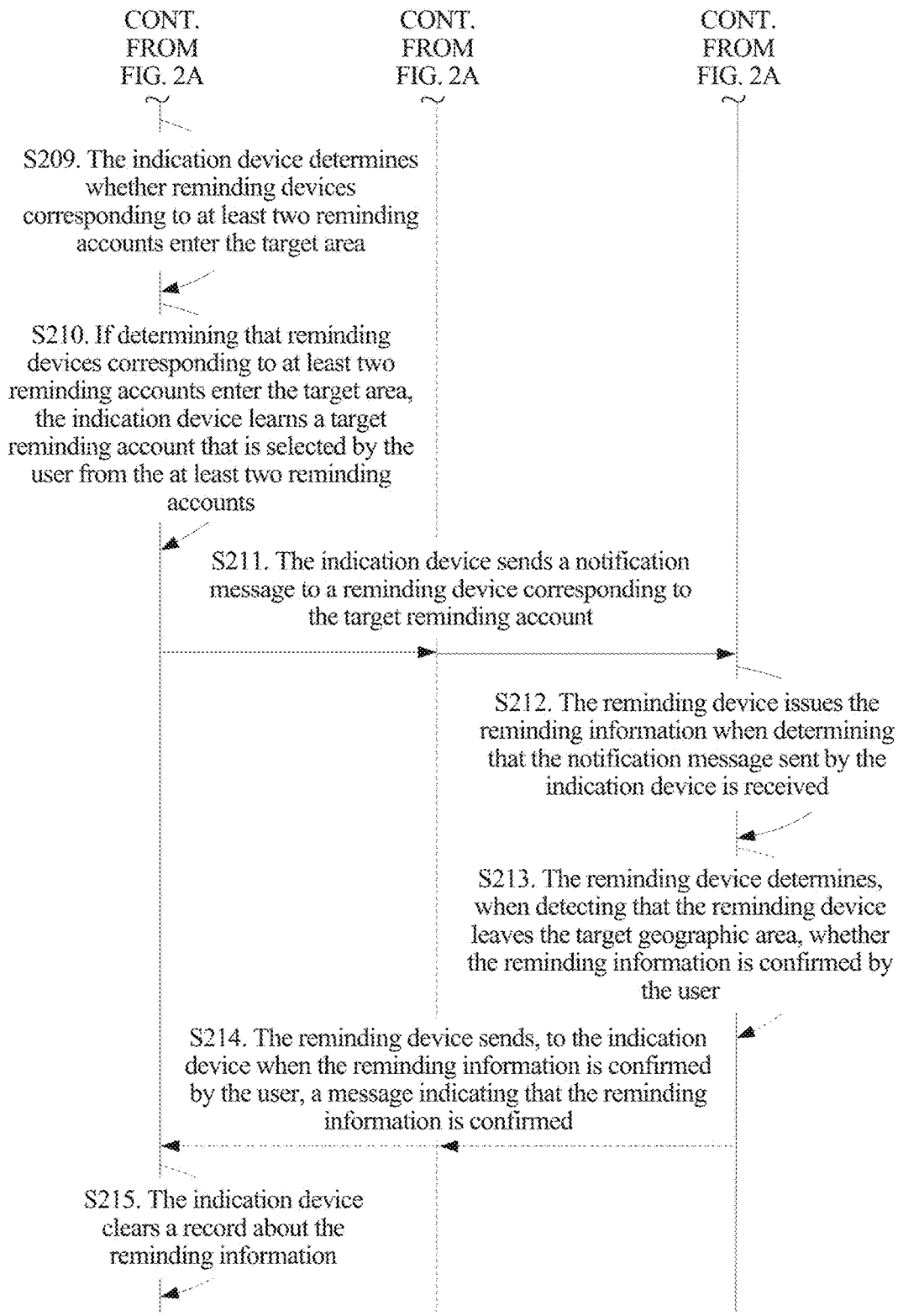

FIG. 2A and FIG. 2B are a schematic flowchart of another location-based reminding method according to an embodiment of the present disclosure. As shown in the figure, a procedure of the location-based reminding method in this embodiment includes steps S201 to S215. Compared with the embodiment described in FIG. 1A and FIG. 1B, a main difference in this embodiment is as follows. There are multiple reminding accounts and multiple reminding devices compared with one reminding account and one reminding device in the embodiment described in FIG. 1A and FIG. 1B. Correspondingly, content of steps S202 to S204, S206, S208, and S213 to S215 is the same as content of steps S102 to S104, S106, S108, and S110 to S112 in FIG. 1A and FIG. 1B respectively. Details are not repeatedly described herein. Different steps are as follows.

S201. An indication device obtains at least two reminding accounts set by a user.

Optionally, an input interface 810 of the indication device obtains a reminding account group set by the user, for example, a family group, a classmate group, or an enterprise group. The reminding account group includes at least two reminding accounts. For a setting of the foregoing group, refer to an implementation in the prior art. This is not limited in the present disclosure.

Further, a communications interface 830 of the indication device sends an indication account and the reminding accounts to a cloud server, so that the cloud server stores a mapping relationship between the indication account and the reminding accounts. For example, a specific process is as follows. After the user A logs in to an account on the indication device, the indication device accesses the cloud server using the indication account (that is, the account of the user A). When obtaining the reminding account group (for example, a family group, including an account of a user B, an account of a user C, and an account of a user D) set by the user A, the indication device invites the multiple accounts using the account of the user A as an initiator of a "trust relationship". After the user B, the user C, and the user D log in to the accounts on respective reminding devices, the reminding devices access the cloud server using the respective accounts. When obtaining confirmation instructions entered by the user B, the user C, and the user D for "trust relationship" invitations, the reminding devices accept the invitations using the accounts as invitees of the "trust relationship". In this case, the "trust relationship" is established between the account of the user A and the accounts in the family group. The cloud server stores the "trust relationship", and the indication device may set a location-based reminder for each reminding device.

Optionally, the indication device may directly communicate with a reminding device without a cloud server. In this manner, the indication device does not need to send an indication account and the reminding accounts to the cloud server. For example, a specific process is as follows. After the user A logs in to an account on the indication device, the indication device directly sends invitations to multiple indication devices (for example, devices to which an account of a user B, an account of a user C, and an account of a user D are respectively logged in) using the account of the user A as an initiator of a "trust relationship". When obtaining confirmation instructions entered by the users for the "trust relationship" invitations, the indication devices accept the invitations using the accounts of the user B, the user C, and the user D as invitees of the "trust relationship". In this case, the "trust relationship" is established between the account of the user A and the accounts. The indication device and the reminding devices store the "trust relationship" in the respective devices, and the indication device may set location-based reminders for the multiple reminding devices.

S205. The indication device sends the first information to reminding devices corresponding to the at least two reminding accounts.

It should be noted that, before step S205, other users have logged in to reminding accounts on reminding devices. For example, the user B, the user C, and the user D log in to the reminding accounts on the respective reminding devices.

The communications interface 830 of the indication device sends the first information to the cloud server. The cloud server finds, according to the mapping relationship, the at least two reminding accounts to which the indication account is mapped, and then forwards the first information to the reminding devices corresponding to the reminding accounts. If the reminding accounts are corresponding to N reminding devices, where N is an integer greater than 1, the cloud server forwards the first information to all or some of the N reminding devices. The user may set, using the indication device or the reminding device, which reminding device the first information is forwarded to. A specific implementation of the setting is not limited in the present disclosure.

Optionally, if the indication device directly communicates with the reminding devices, the communications interface 830 of the indication device directly sends the first information to the reminding devices.

Correspondingly, a communications interface 830 of each reminding device receives the first information.

S207. The reminding device sends, to the indication device when detecting that the reminding device enters the target geographic area, a message indicating that the reminding device enters the target geographic area.

When any one of the reminding devices detects, using a locator 850 and a processor 820, that the device enters the target geographic area, a communications interface 830 of the reminding device sends, to the cloud server, a message indicating that the reminding device enters the target geographic area. Then, the cloud server finds the indication account according to the mapping relationship, and sends, to the indication device corresponding to the indication account, the message indicating that the reminding device enters the target geographic area.

In a specific implementation process, a reminding device B is used as an example. Because the reminding account of the user B is logged in to the reminding device B, a location of the reminding device B may be used as a location of the user B. If the reminding device B detects that the device enters the target geographic area, the reminding device B sends, to the cloud server, a message indicating that the reminding device B or the user B enters the target geographic area. Then, the cloud server finds the indication account according to the mapping relationship, and sends, to the indication device corresponding to the indication account, the message indicating that the reminding device B or the user B enters the target geographic area.

It can be understood that, if the trust relationship is established based on the reminding accounts and the indication account, to issue the reminding information to the user more intuitively, a message indicating that a user corresponding to a reminding account enters the target geographic area may be sent to the cloud server. If a reminding account is corresponding to more than one device, a message indicating that a reminding device enters the target geographic area may be sent to the indication device using the cloud server, where the message carries an identifier of the reminding device, so that the user knows the reminding device entering the target geographic area. Optionally, if the trust relationship is established based on identifiers of the reminding devices and an identifier of the indication device, a message indicating that a reminding device enters the target geographic area may be sent to the indication device using the cloud server.

Optionally, if the indication device directly communicates with the reminding device, a communications interface 830 of the reminding device directly sends, to the reminding device, the message indicating that the reminding device enters the target geographic area.

S209. The indication device determines whether reminding devices corresponding to at least two reminding accounts enter the target area.

A processor 820 of the indication device may determine, according to the received message indicating that the reminding device enters the target geographic area, whether reminding devices corresponding to at least two reminding accounts enter the target area.

For example, if receiving a message indicating that the user B enters the target geographic area and a message indicating that the user D enters the target geographic area, the indication device determines that two reminding devices enter the target geographic area, that is, the reminding device B and a reminding device D enter the target geographic area.

S210. If determining that reminding devices corresponding to at least two reminding accounts enter the target area, the indication device learns a target reminding account that is selected by the user from the at least two reminding accounts.

An output interface 840 and the input interface 810 of the indication device push, to the user, the reminding accounts entering the target area, and the user selects the target reminding account from the reminding accounts, so that the indication device learns the target reminding account. Optionally, the output interface 840 of the indication device pushes the reminding accounts entering the target area to the user in multiple manners, for example, displays, using a screen, the reminding accounts entering the target area, or plays, in voice, the reminding accounts entering the target area. This is not limited herein.

For example, the indication device displays an option box in a pop-up window, and the option box includes two options: "Reminding account B" and "Reminding account D". When the user clicks "Reminding account B", the processor 820 of the indication device uses the reminding account B as the target reminding account. When the user clicks "Reminding account D", the processor 820 of the indication device uses the reminding account D as the target reminding account.

S211. The indication device sends a notification message to a reminding device corresponding to the target reminding account.

The communications interface 830 of the indication device sends the notification message and the target reminding account to the cloud server, and the cloud server forwards the notification message to the reminding device corresponding to the target reminding account.

Optionally, if the indication device directly communicates with the reminding device, the communications interface 830 of the indication device directly sends the notification message to the reminding device corresponding to the target reminding account.

S212. The reminding device issues the reminding information when determining that the notification message sent by the indication device is received.

In this embodiment, a processor 820 of the reminding device issues the reminding information using an output interface 840, when determining that the device meets a preset reminding condition. The preset reminding condition includes entering the target geographic area and receiving the notification message. It can be learned from step S207 that the reminding device enters the target geographic area, and the reminding device may determine, when receiving the notification message, that the reminding device meets the preset reminding condition. In this case, the reminding device issues a reminder.

The output interface 840 of the reminding device issues the reminding information in multiple manners, for example, displays the reminding information using a screen, or plays the reminding information in voice, provided that a reminding effect can be achieved. This is not limited herein. For example, the reminding device rings and displays "Go to a supermarket to buy milk" in a pop-up window. For another example, the reminding device plays "Go to a supermarket to buy milk" in voice.

It should be noted that, compared with the embodiment described in FIG. 1A and FIG. 1B, in this embodiment, the reminding device can issue the reminder only after entering the target geographic area and receiving the notification message. The reason lies in that, when multiple reminding devices enter the target geographic area, if there is no limitation, each reminding device issues a reminder, and a reminder may be repeatedly performed. For example, multiple family members buy milk after being reminded.

It can be learned from the foregoing description that, in this embodiment of the present disclosure, the user A sets the reminding information and multiple reminding accounts on the indication device; the indication device sends the reminding information set by the user A to a reminding device corresponding to each reminding account; after obtaining the reminding information and the target geographic area and after entering the target geographic area, the reminding device may send, to the indication device, a message indicating that the reminding device enters the target geographic area, so as to notify the user A that the reminding device enters the target geographic area; the indication device sends the notification message to the target reminding device selected by the user A; and the target reminding device issues the reminding information after receiving the notification message, so that the user B carrying or using the target reminding device can obtain the location-based reminder. In addition, neither the user A nor the user B needs to additionally set the reminding information on the reminding device. Therefore, in this embodiment of the present disclosure, user operations are simplified, functions of a location-based reminder become more diversified, and interactivity is more desirable.

Figure 3A:
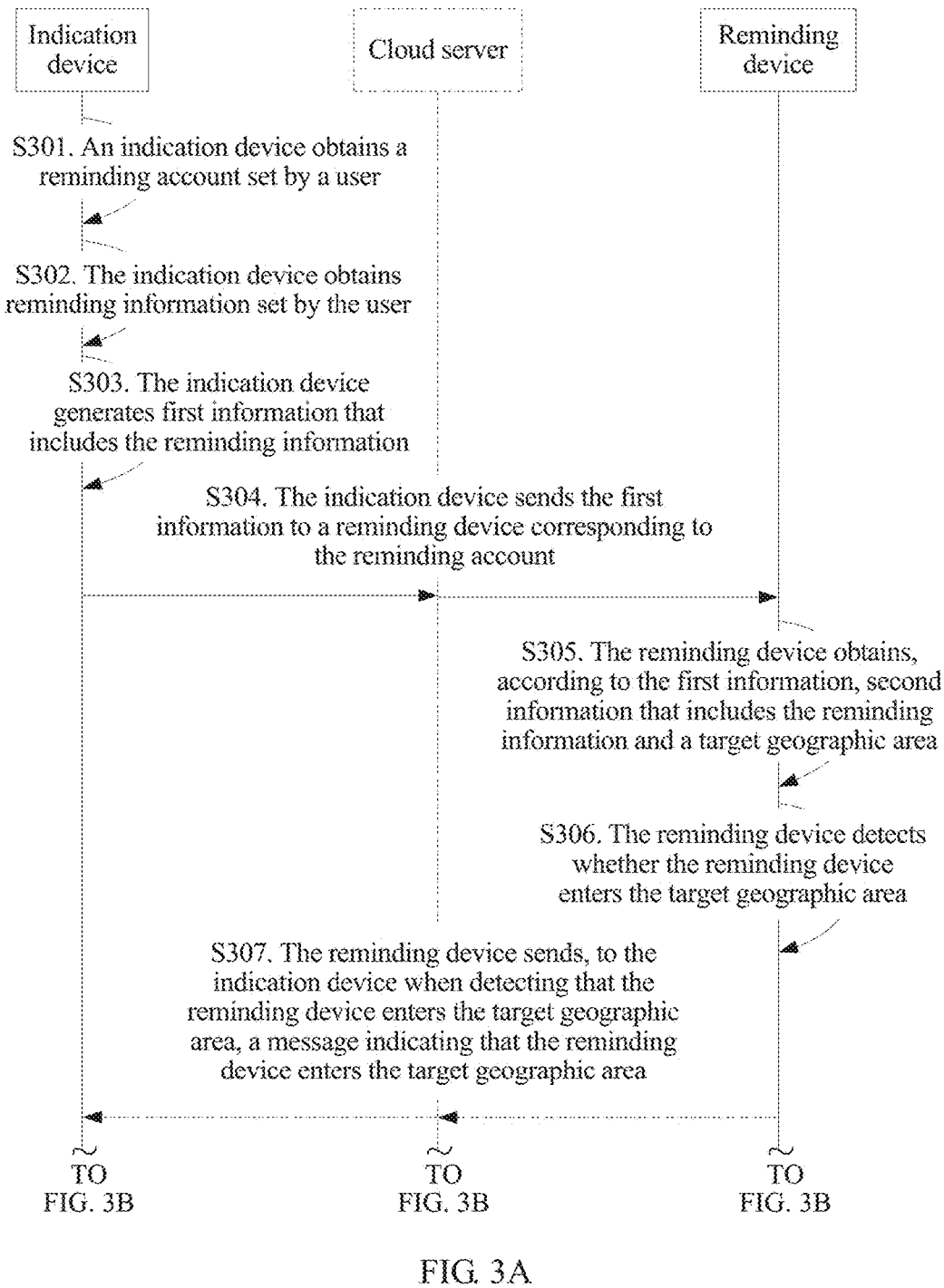

FIG. 3A and FIG. 3B are a schematic flowchart of still another location-based reminding method according to an embodiment of the present disclosure. As shown in the figure, a procedure of the location-based reminding method in this embodiment may include steps S301 to S312. Compared with the embodiment described in FIG. 1A and FIG. 1B, a main difference in this embodiment is an indication device does not need to determine a target geographic area and a reminding device determines the target geographic area. Correspondingly, content of steps S301, S302, S304, and S306 to S312 is the same as content of steps S101, S102, S105, and S106 to S112 in FIG. 1A and FIG. 1B respectively. Details are not repeatedly described herein. Different steps are as follows.

S303. The indication device generates first information that includes the reminding information.

A processor 820 of the indication device generates the first information that includes the reminding information.

S305. The reminding device obtains, according to the first information, second information that includes the reminding information and a target geographic area.

A processor 820 of the reminding device obtains the reminding information from the first information, determines the target geographic area related to the reminding information, and generates the second information that includes the reminding information and the target geographic area. In a specific implementation process, a method for determining, by the reminding device, the target geographic area related to the reminding information is the same as the method, described in step S103 in FIG. 1A, for determining, by the indication device, the target geographic area related to the reminding information. Details are not repeatedly described herein.

It can be learned from the foregoing description that, in this embodiment of the present disclosure, the user A sets the reminding information and the reminding account on the indication device; the indication device sends the reminding information set by the user A to the reminding device corresponding to the reminding account; and after obtaining the reminding information, the reminding device determines the target geographic area, and issues the reminding information after entering the target geographic area, so that the user B carrying or using the reminding device can obtain the location-based reminder. In addition, the indication device does not need to obtain the target geographic area. Therefore, load of the indication device is reduced. That the reminding device obtains the target geographic area is more targeted, so that the location-based reminder is more accurate.

Figure 4A:
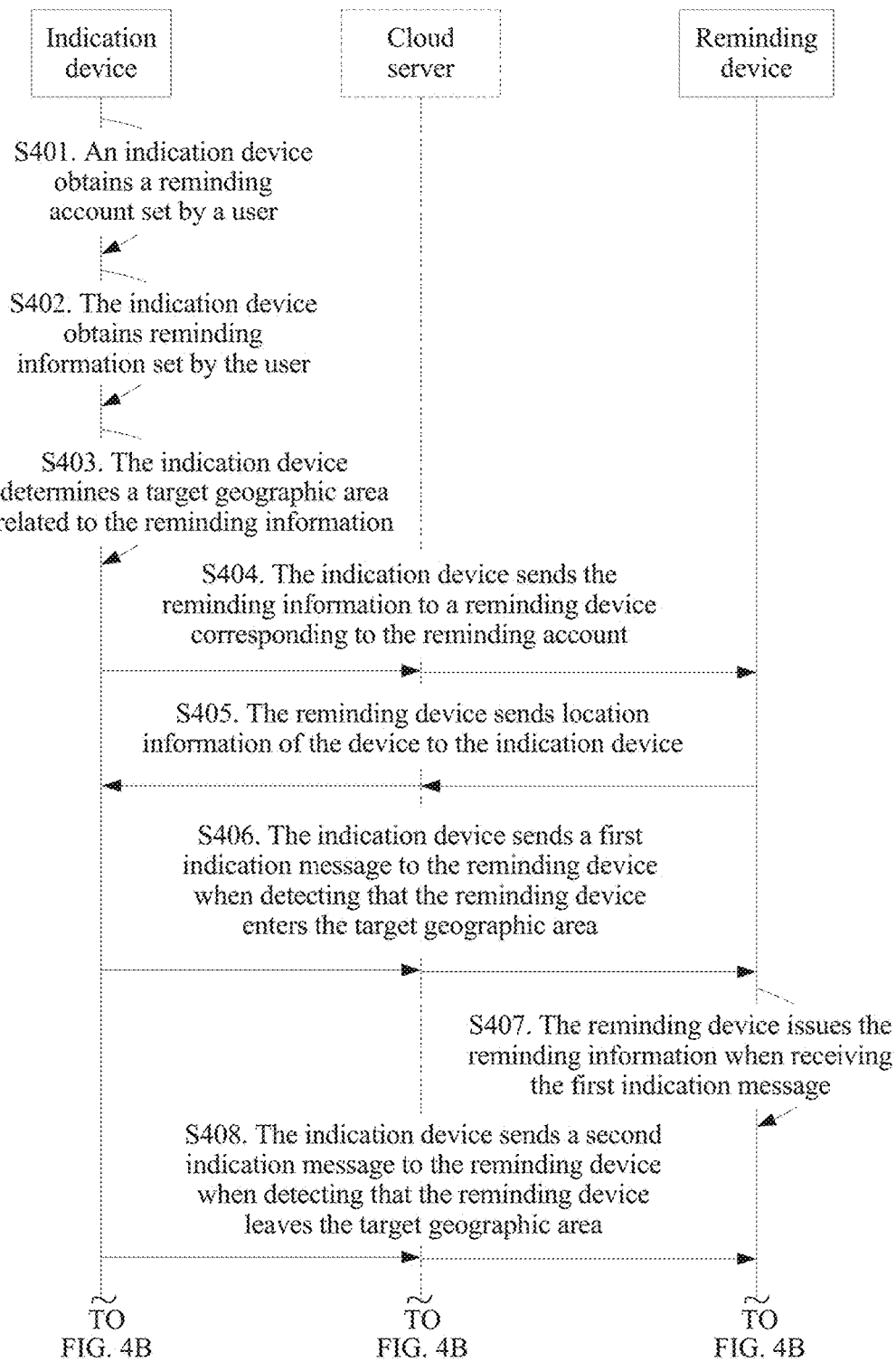
FIG. 4A and FIG. 4B are a schematic flowchart of yet another location-based reminding method according to an embodiment of the present disclosure.
Figure 4B:
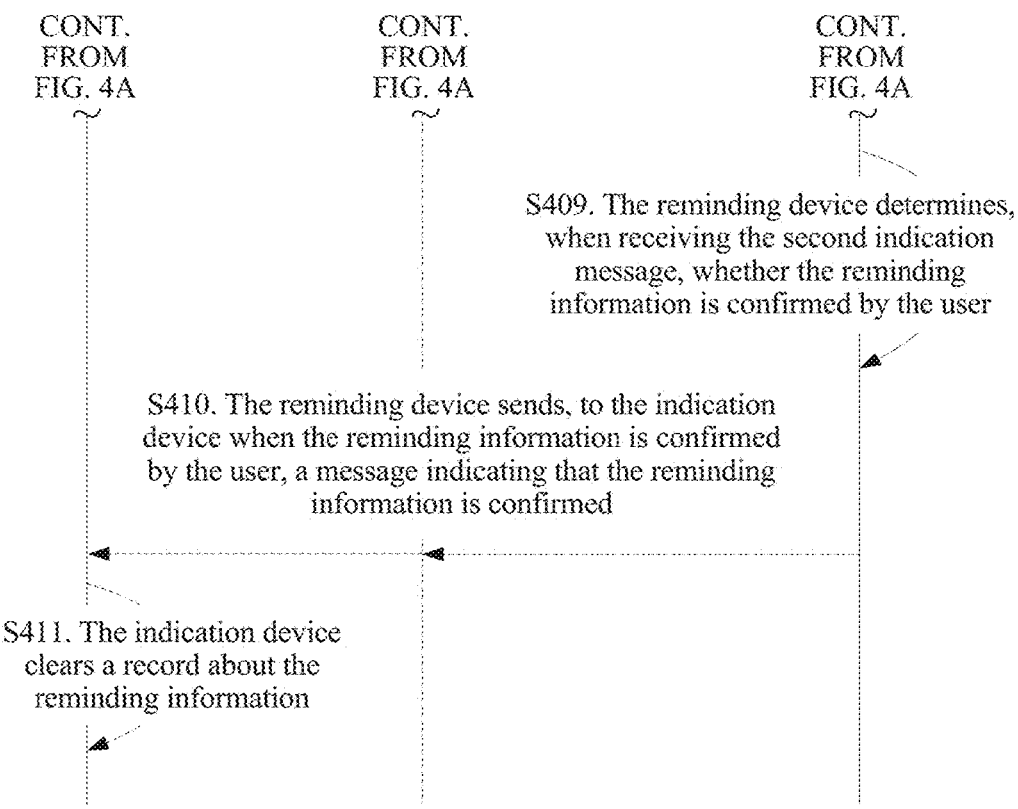

FIG. 4A and FIG. 4B are a schematic flowchart of yet another location-based reminding method according to an embodiment of the present disclosure. As shown in the figure, a procedure of the location-based reminding method in this embodiment may include steps S401 to S411. Compared with the embodiment described in FIG. 1A and FIG. 1B, a main difference in this embodiment is an indication device detects whether a reminding device enters or leaves a target geographic area and the reminding device no longer performs detection. Correspondingly, content of steps S401 to S403, S410, and S411 is the same as content of steps S101 to S103, S111, and S112 in FIG. 1A and FIG. 1B respectively. Details are not repeatedly described herein. Different steps are as follows.

S404. The indication device sends the reminding information to a reminding device corresponding to the reminding account.

A communications interface 830 of the indication device sends the reminding information to a cloud server. The cloud server finds, according to a mapping relationship, the reminding account to which an indication account is mapped, and then forwards the reminding information to the reminding device corresponding to the reminding account.

Optionally, if the indication device directly communicates with the reminding device, a communications interface 830 of the indication device directly sends the reminding information to the reminding device.

Correspondingly, a communications interface 830 of the reminding device receives the reminding information.

S405. The reminding device sends location information of the device to the indication device.

A locator 850 of the reminding device obtains the location information of the reminding device, and the communications interface 830 of the reminding device sends the location information to the cloud server. Then, the cloud server finds, according to the mapping relationship, the indication account to which the reminding account is mapped, and sends the location information to the indication device corresponding to the indication account.

Optionally, if the indication device directly communicates with the reminding device, the communications interface 830 of the reminding device directly sends the location information to the reminding device.

It should be noted that the location information is generally obtained by means of GPS positioning. Quite high power consumption is used in this positioning manner. To reduce power consumption, this embodiment provides a method for dynamically querying location information. It should be understood that, in addition to the GPS positioning, technologies for querying location information include cellular data positioning and WiFi positioning. Power consumption of the cellular data positioning, power consumption of the WiFi positioning, and power consumption of the GPS positioning are in ascending order. Correspondingly, positioning precision of the cellular data positioning, positioning precision of the WiFi positioning, and positioning precision of the GPS positioning are also in ascending order.

Therefore, the reminding device may dynamically adjust a positioning manner according to currently required positioning precision. In this way, high power consumption caused by continuous GPS positioning is avoided while positioning precision is ensured.

In an optional implementation, when the reminding device is relatively far away from the target geographic area, the locator 850 of the reminding device uses the most power-saving cellular data positioning manner. When a distance between the reminding device and the target geographic area is moderate, the locator 850 of the reminding device uses the second most power-saving WiFi positioning manner. When the reminding device is relatively close to the target geographic area, the locator 850 of the reminding device uses the least power-saving GPS positioning manner. Equivalently, as a distance increases, a more power-saving positioning manner with lower precision is used, so that power consumption of the reminding device can be reduced.

In a specific implementation process, the indication device first sends a first location request to the reminding device. When receiving the first location request, the reminding device obtains first location information of the device and obtains a moving speed and a moving direction of the device in the cellular data positioning manner, and sends the obtained first location information, moving speed, and moving direction to the indication device. The indication device determines, according to the first location information, the moving speed, and the moving direction, a moment of sending a second location request, and sends the second location request to the reminding device at the moment of sending the second location request. When receiving the second location request, the reminding device obtains second location information of the device and obtains a moving speed and a moving direction of the device in the WiFi positioning manner, and sends the obtained second location information, moving speed, and moving direction to the indication device. The indication device determines, according to the second location information, the moving speed, and the moving direction, a moment of sending a third location request, and sends the third location request to the reminding device at the moment of sending the third location request. When receiving the third location request, the reminding device obtains third location information of the device and obtains a moving speed and a moving direction of the device in the GPS positioning manner, and sends the obtained third location information, moving speed, and moving direction to the indication device.

In brief, when the reminding device is relatively far away from the target geographic area, the cellular data positioning manner is used; and when the reminding device is relatively close to the target geographic area, the GPS positioning manner is used. Alternatively, when the reminding device is relatively far away from the target geographic area, the cellular data positioning manner is used; and when the reminding device is relatively close to the target geographic area, the WiFi positioning manner is used.

Still optionally, a processor 820 of the indication device dynamically adjusts, according to currently required positioning precision, frequency of requesting location information from the reminding device by the communications interface 830 of the indication device, so as to reduce power consumption. For example, when the reminding device is relatively far away from the target geographic area, location information of the reminding device is requested every five minutes; and when the reminding device is relatively close to the target geographic area, location information of the reminding device is requested every 30 seconds.

S406. The indication device sends a first indication message to the reminding device when detecting that the reminding device enters the target geographic area.

When the processor 820 of the indication device detects that the reminding device enters the target geographic area, the communications interface 830 of the indication device sends the first indication message to the reminding device.

S407. The reminding device issues the reminding information when receiving the first indication message.

When the communications interface 830 of the reminding device receives the first indication message, an output interface 840 of the reminding device issues the reminding information.

S408. The indication device sends a second indication message to the reminding device when detecting that the reminding device leaves the target geographic area.

When the processor 820 of the indication device detects that the reminding device leaves the target geographic area, the communications interface 830 of the indication device sends the second indication message to the reminding device.

S409. The reminding device determines, when receiving the second indication message, whether the reminding information is confirmed by the user.

When the communications interface 830 of the reminding device receives the second indication message, the output interface 840 of the reminding device asks the user B whether a reminder corresponding to the reminding information is completed.

It can be learned from the foregoing description that, in this embodiment of the present disclosure, the user A sets the reminding information and the reminding account on the indication device; the indication device determines the target geographic area according to the reminding information set by the user A, sends the reminding information to the reminding device corresponding to the reminding account, and sends a message to control the positioning manner of the reminding device; the reminding device sends obtained location information to the indication device; and the indication device sends the message to the reminding device when determining that the reminding device enters the target geographic area, to control the reminding device to issue the reminder, so that the user B carrying or using the reminding device can obtain the location-based reminder. The positioning manner is determined according to different positioning precision required for different distances between the reminding device and the target geographic area, so that the reminding device can use a positioning manner with lower power consumption when required positioning precision is not high. In this way, the power consumption of the reminding device is reduced.

Figure 5:
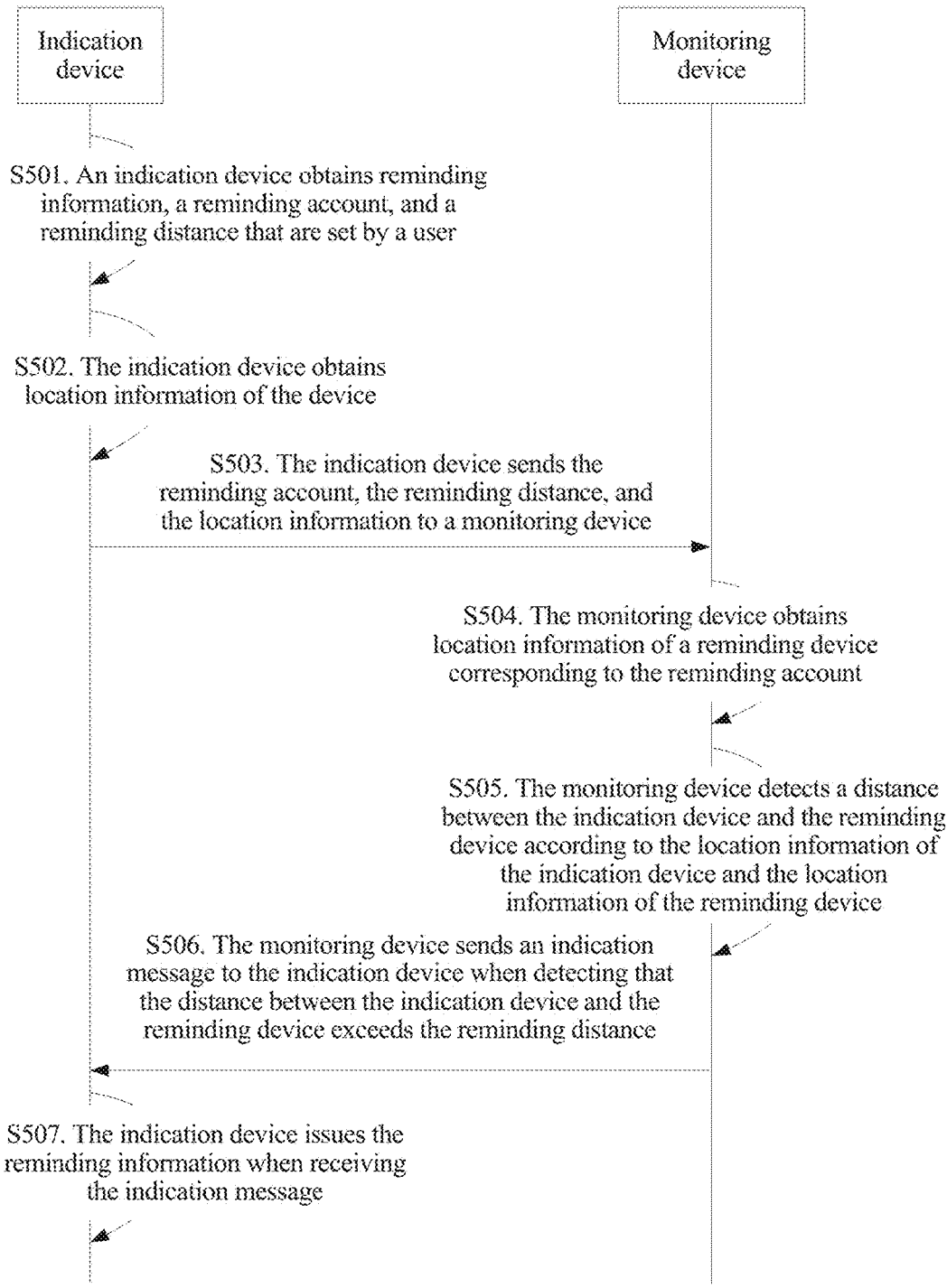
FIG. 5 is a schematic flowchart of still yet another location-based reminding method according to an embodiment of the present disclosure.

FIG. 5 is a schematic flowchart of still yet another location-based reminding method according to an embodiment of the present disclosure. In this embodiment, in an application scenario, a monitoring device is further included. An indication device can communicate with the monitoring device, and a reminding device can also communicate with the monitoring device. As shown in the figure, a procedure of the location-based reminding method in this embodiment may include the following steps.

S501. The indication device obtains reminding information, a reminding account, and a reminding distance that are set by a user.

An input interface 810 of the indication device obtains the reminding information, the reminding account, and the reminding distance that are set by the user.

Further, a "trust relationship" is established between the indication device and the reminding device corresponding to the reminding account. For example, a specific process is as follows. After the user A logs in to an account on the indication device, the indication device accesses the monitoring device using an indication account (that is, the account of the user A). When obtaining the reminding account (for example, an account of a user B) set by the user A, the indication device invites the account of the user B using the account of the user A as an initiator of the "trust relationship". After the user B logs in to the account on the reminding device, the reminding device accesses the monitoring device using the account of the user B. When obtaining a confirmation instruction entered by the user B for a "trust relationship" invitation, the reminding device accepts the invitation using the account of the user B as an invitee of the "trust relationship". In this case, the "trust relationship" is established between the account of the user A and the account of the user B. The monitoring device stores the "trust relationship", and then the indication device may set a reminder that is based on a location of the reminding device.

Optionally, the user A sets the reminding information in multiple manners. The user A may set the reminding information by editing a text or by inputting a voice. For example, a text "The child is away from the parent for more than 20 meters" is edited. For another example, a voice "The taxi is away from the taxi passenger for more than 500 meters" is input.

S502. The indication device obtains location information of the device.

A locator 850 of the indication device obtains the location information of the device.

For example, assuming that the indication device is a smartphone of the parent (that is, the user A), the smartphone obtains a current location of the smartphone. For another example, assuming that the indication device is a tablet computer of the taxi passenger (that is, the user A), the tablet computer obtains a current location of the tablet computer.

S503. The indication device sends the reminding account, the reminding distance, and the location information to the monitoring device.

A communications interface 830 of the indication device sends the reminding account, the reminding distance, and the location information to the monitoring device.

Correspondingly, a communications interface 910 of the monitoring device receives the reminding account, the reminding distance, and the location information.

S504. The monitoring device obtains location information of the reminding device corresponding to the reminding account.

The communications interface 910 of the monitoring device sends a message for requesting the location information to the reminding device, so that a locator 850 of the reminding device obtains the location information, and sends the location information of the reminding device to the monitoring device.

For example, assuming that the reminding device is a wearable device of the child (that is, the user B), the monitoring device obtains location information of the wearable device. For another example, assuming that the reminding device is an in-vehicle electronic device of a taxi driver (that is, the user B), the monitoring device obtains location information of the in-vehicle electronic device.

S505. The monitoring device detects a distance between the indication device and the reminding device according to the location information of the indication device and the location information of the reminding device.

A processor 930 of the monitoring device determines a location of the indication device and a location of the reminding device on an electronic map, and calculates the distance between the two locations.

S506. The monitoring device sends an indication message to the indication device when detecting that the distance between the indication device and the reminding device exceeds the reminding distance.

When the processor 930 of the monitoring device detects that the distance between the indication device and the reminding device exceeds the reminding distance, the communications interface 910 of the monitoring device sends the indication message to the indication device.

For example, the monitoring device sends an indication message to the smartphone of the parent when detecting that the wearable device of the child is away from the smartphone of the parent for more than 20 meters. For another example, the monitoring device sends an indication message to the tablet computer of the taxi passenger when detecting that the in-vehicle electronic device of the taxi driver is away from the tablet computer of the taxi passenger for more than 500 meters.

S507. The indication device issues the reminding information when receiving the indication message.

An output interface 840 of the indication device issues a reminder when the communications interface 830 of the indication device receives the indication message.

The reminding information is issued in multiple manners, for example, the reminding information is displayed using a screen, or the reminding information is played in voice, provided that a reminding effect can be achieved. This is not limited herein. For example, the smartphone of the parent issues "The child is away from the parent for more than 20 meters" to the parent when receiving the indication message. For another example, the tablet computer of the taxi passenger issues "The taxi is away from the taxi passenger for more than 500 meters" to the taxi passenger when receiving the indication message.

Optionally, if the communications interface 830 of the indication device has sent the reminding information to the monitoring device, when the processor 930 of the monitoring device detects that the distance between the indication device and the reminding device exceeds the reminding distance, an output interface 940 of the monitoring device also issues a reminder.

It can be learned from the foregoing description that, in this embodiment of the present disclosure, the user A sets the reminding information and the reminding account on the indication device; the indication device sends, to the monitoring device, the reminding information and the reminding account that are set by the user A; and the monitoring device sends the message to the indication device when detecting that the distance between the indication device and the reminding device corresponding to the reminding account exceeds the reminding distance, to control the reminding device to issue the reminder, so that the user A can be reminded when the distance between the indication device and the user B carrying or using the reminding device exceeds the reminding distance. In addition, the distance between the indication device and the reminding device is detected by the third-party monitoring device alone instead of the indication device and the reminding device, so that load of the indication device and load of the reminding device are reduced.

Figure 6:
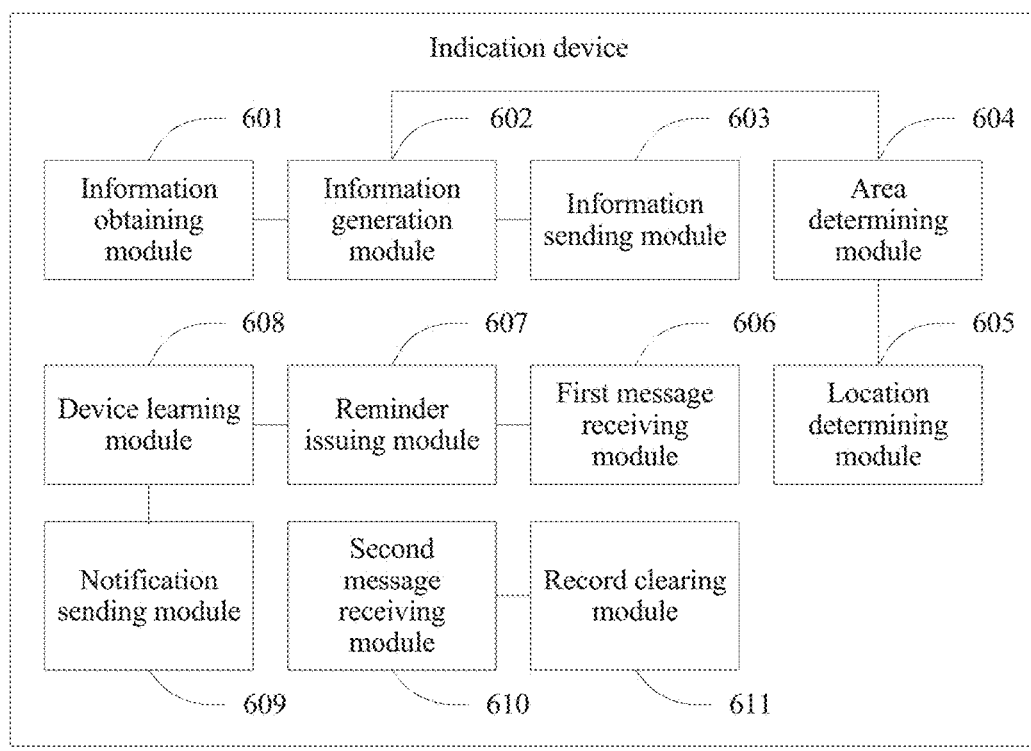
FIG. 6 is a schematic structural diagram of an indication device according to an embodiment of the present disclosure.

FIG. 6 is a schematic structural diagram of an indication device according to an embodiment of the present disclosure. The indication device is configured to execute some or all of methods corresponding to the indication device described in FIG. 1A and FIG. 1B, FIG. 2A and FIG. 2B, or FIG. 3A and FIG. 3B. Related descriptions in the foregoing method embodiments are also applicable to this apparatus embodiment. Details are not repeatedly described herein. As shown in the figure, the indication device in this embodiment of the present disclosure may include at least an information obtaining module 601, an information generation module 602, and an information sending module 603.

The information obtaining module 601 may include an input interface 810, and is configured to obtain reminding information and at least one reminding account that are set by a user. Each of the at least one reminding account is corresponding to at least one reminding device.

The information generation module 602 may include a processor 820, and is configured to generate first information that includes the reminding information.

The information sending module 603 may include a communications interface 830, and is configured to send the first information to a reminding device corresponding to the at least one reminding account, so that the reminding device corresponding to the at least one reminding account obtains second information according to the first information. The second information includes the reminding information and a target geographic area. Each reminding device corresponding to the at least one reminding account issues the reminding information when determining that the reminding device meets a preset reminding condition. The preset reminding condition includes entering the target geographic area.

Referring to FIG. 6, the indication device shown in the figure in this embodiment of the present disclosure may further include an area determining module 604, which is configured to determine the target geographic area related to the reminding information. Correspondingly, the information generation module 602 is further configured to generate, by the indication device, the first information that includes the reminding information and the target geographic area.

Optionally, the area determining module 604 is configured to determine at least two target geographic areas on the preset electronic map. Each target geographic area includes one target location.

Referring to FIG. 6, the indication device shown in the figure in this embodiment of the present disclosure may further include a location determining module 605. The location determining module 605 may also include a processor 820, and is configured to search the preset electronic map for a target location related to a keyword of the reminding information. Correspondingly, the area determining module 604 is further configured to determine the target geographic area that includes the target location on the preset electronic map.

Referring to FIG. 6, the indication device shown in the figure in this embodiment of the present disclosure may further include a first message receiving module 606 and a reminder issuing module 607.

The first message receiving module 606 may include a communications interface 830, and is configured to receive a message that is sent by the reminding device corresponding to the at least one reminding account and that indicates that the reminding device enters the target geographic area.

The reminder issuing module 607 may include an output interface 840, and is configured to issue the reminding information.

Referring to FIG. 6, the indication device shown in the figure in this embodiment of the present disclosure may further include a device learning module 608 and a notification sending module 609.

The device learning module 608 may also include a processor 820, and is configured to determine whether reminding devices corresponding to at least two reminding accounts enter the target area; and if reminding devices corresponding to at least two reminding accounts enter the target area, learn a target reminding account that is selected by the user from the at least two reminding accounts.

The notification sending module 609 may also include a communications interface 830, and is configured to send a notification message to a reminding device corresponding to the target reminding account. The preset reminding condition further includes receiving the notification message.

Referring to FIG. 6, the indication device shown in the figure in this embodiment of the present disclosure may further include a second message receiving module 610 and a record clearing module 611.

The second message receiving module 610 may also include a communications interface 830, and is configured to receive a message that is sent by the reminding device corresponding to the at least one reminding account and that indicates that the reminding information is confirmed.

The record clearing module 611 may also include a processor 820, and is configured to clear a record about the reminding information.

It can be learned from the foregoing description that, in this embodiment of the present disclosure, the indication device may include at least the information obtaining module 601, the information generation module 602, and the information sending module 603. The information obtaining module 601 obtains the reminding information and the reminding account that are set by the user A. The information generation module 602 generates a message that includes the reminding information. The information sending module 603 sends the message that includes the reminding information to the reminding device corresponding to each reminding account. After obtaining the reminding information and the target geographic area, the reminding device may issue the reminder after the reminding device enters the target geographic area or after the reminding device enters the target geographic area and meets another condition, so that the user B carrying or using the reminding device can obtain the location-based reminder. In addition, neither the user A nor the user B needs to additionally set the reminding information on the reminding device. Therefore, in this embodiment of the present disclosure, user operations are simplified, functions of a location-based reminder become more diversified, and interactivity is more desirable.

Figure 7:
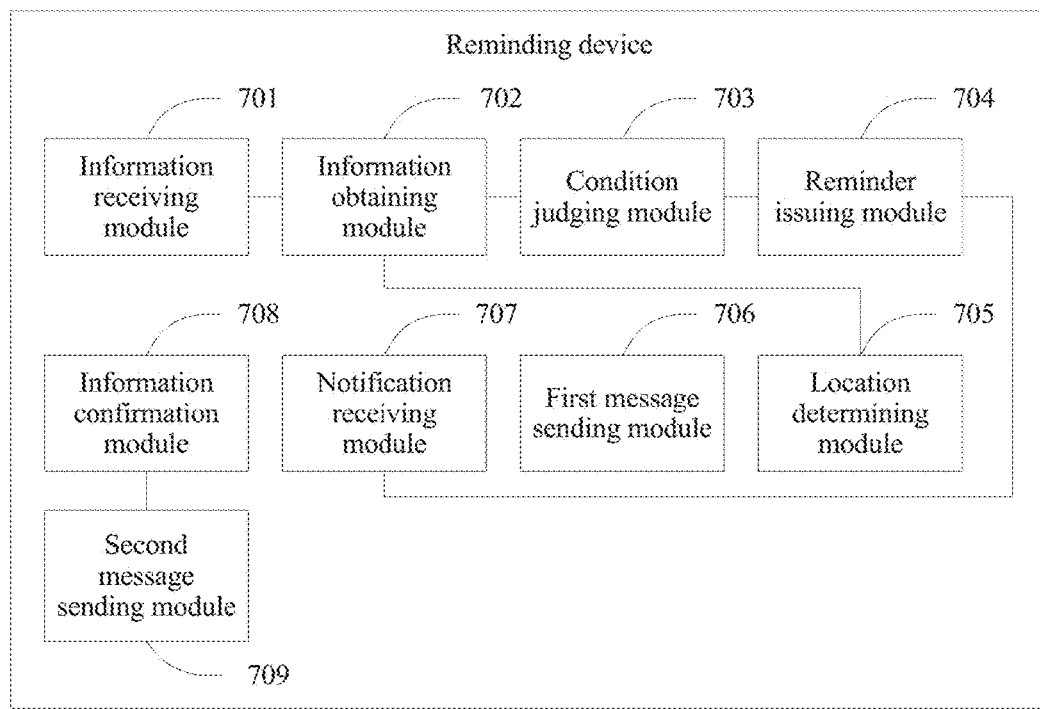
FIG. 7 is a schematic structural diagram of a reminding device according to an embodiment of the present disclosure.

FIG. 7 is a schematic structural diagram of a reminding device according to an embodiment of the present disclosure. The reminding device is configured to execute some or all of methods corresponding to the target reminding device described in FIG. 1A and FIG. 1B, FIG. 2A and FIG. 2B, or FIG. 3A and FIG. 3B. Related descriptions in the foregoing method embodiments are also applicable to this apparatus embodiment. Details are not repeatedly described herein. As shown in the figure, the reminding device in this embodiment of the present disclosure may include at least an information receiving module 701, an information obtaining module 702, a condition judging module 703, and a reminder issuing module 704.

The information receiving module 701 may include a communications interface 830, and is configured to receive first information sent by an indication device. The first information includes reminding information.

The information obtaining module 702 may include a processor 820, and is configured to obtain second information according to the first information. The second information includes the reminding information and a target geographic area.

The condition judging module 703 may include a locator 850 and a processor 820, and is configured to determine whether the reminding device meets a preset reminding condition. The preset reminding condition includes entering the target geographic area.

The reminder issuing module 704 may include an output interface 840, and is configured to issue, by the reminding device, the reminding information if the reminding device meets the preset reminding condition.

Optionally, the information obtaining module 702 is configured to obtain the reminding information from the first information; determine the target geographic area related to the reminding information; and obtain the second information that includes the reminding information and the target geographic area.

Referring to FIG. 7, the reminding device shown in the figure in this embodiment of the present disclosure may further include a location determining module 705. The location determining module 705 may also include a processor 820, and is configured to search a preset electronic map for a target location related to a keyword of the reminding information. Correspondingly, the information obtaining module 702 is further configured to determine the target geographic area that includes the target location on the preset electronic map.

Optionally, the information obtaining module 702 is configured to determine at least two target geographic areas on the preset electronic map. Each target geographic area includes one target location.

Referring to FIG. 7, the reminding device shown in the figure in this embodiment of the present disclosure may further include a first message sending module 706. The first message sending module 706 may include a locator 850 and a communications interface 830, and is configured to send, to the indication device when it is detected that the reminding device enters the target geographic area, a message indicating that the reminding device enters the target geographic area.

Referring to FIG. 7, the reminding device shown in the figure in this embodiment of the present disclosure may further include a notification receiving module 707. The notification receiving module 707 may also include a communications interface 830, and is configured to receive a notification message sent by the indication device. The preset reminding condition further includes receiving the notification message.

Referring to FIG. 7, the reminding device shown in the figure in this embodiment of the present disclosure may further include an information confirmation module 708 and a second message sending module 709.

The information confirmation module 708 may include an input interface 810 and a processor 820, and is configured to determine, when it is detected that the reminding device leaves the target geographic area, whether the reminding information is confirmed by a user.

The second message sending module 709 may also include a communications interface 830, and is configured to send, by the reminding device to the indication device if the reminding information is confirmed by the user, a message indicating that the reminding information is confirmed.

It can be learned from the foregoing description that, in this embodiment of the present disclosure, the reminding device may include at least the information receiving module 701, the information obtaining module 702, the condition judging module 703, and the reminder issuing module 704. The user A sets the reminding information on the indication device. The indication device sends a message that includes the reminding information. The information receiving module 701 receives the message. The information obtaining module 702 obtains the target geographic area according to the message. After the condition judging module 703 determines that the reminding device enters the target geographic area or that the reminding device enters the target geographic area and meets another condition, the reminder issuing module 704 issues the reminder, so that the user B carrying or using the reminding device can obtain the location-based reminder. In addition, neither the user A nor the user B needs to additionally set the reminding information on the reminding device. Therefore, in this embodiment of the present disclosure, user operations are simplified, functions of a location-based reminder become more diversified, and interactivity is more desirable.

FIG. 8 is a schematic structural diagram of a mobile terminal according to an embodiment of the present disclosure. As shown in the figure, the mobile terminal may include an input interface 810, a processor 820, a communications interface 830, an output interface 840, a locator 850, a memory 860, and a power supply 870. The input interface 810 may be a sensitive screen 811 and a microphone 812 and is configured to obtain an instruction entered by a user, or may be another component that can obtain an instruction entered by a user, for example, a physical button, a camera, or a distance sensor. The communications interface 830 may be a WiFi module, a GSM module, a Bluetooth module, or the like, and is configured to communicate with another device. The output interface 840 may include a display panel 841 and a loudspeaker 842 and is configured to remind the user, or may include another component that can remind the user, for example, a headset, a vibration motor, or a signal light. The locator 850 may be a GPS module, a GSM module, a WiFi module, or the like, and is configured to obtain location information. The memory 860 may be a high-speed RAM memory, or may be a nonvolatile memory (non-volatile memory), for example, at least one magnetic disk memory. The memory 860 may store program code, to instruct the processor 820 to perform a corresponding operation. The power supply 870 is configured to supply power to the mobile terminal.

On the one hand, the mobile terminal may be the indication device in FIG. 1A and FIG. 1B to FIG. 4A and FIG. 4B. It should be noted that, for the mobile terminal used as the indication device, the locator 850 is not mandatory.

The input interface 810 is configured to obtain reminding information and at least one reminding account that are set by a user. Each of the at least one reminding account is corresponding to at least one reminding device. The processor 820 is configured to generate first information that includes the reminding information. The communications interface 830 is configured to send the first information to a reminding device corresponding to the at least one reminding account, so that the reminding device corresponding to the at least one reminding account obtains second information according to the first information. The second information includes the reminding information and a target geographic area. Each reminding device corresponding to the at least one reminding account issues the reminding information when determining that the reminding device meets a preset reminding condition. The preset reminding condition includes entering the target geographic area.

Optionally, the processor 820 is further configured to determine, before generating the first information that includes the reminding information, the target geographic area related to the reminding information. A specific operation of generating, by the processor 820, the first information that includes the reminding information is generating the first information that includes the reminding information and the target geographic area.

Further, the processor 820 is further configured to search, before determining the target geographic area related to the reminding information, a preset electronic map for a target location related to a keyword of the reminding information. A specific operation of determining, by the processor 820, the target geographic area related to the reminding information is determining the target geographic area that includes the target location on the preset electronic map.

Still further, if at least two target locations that have a same attribute are found on the preset electronic map, where the attribute is related to the keyword of the reminding information, a specific operation of determining, by the processor 820, the target geographic area that includes the target location on the preset electronic map is determining at least two target geographic areas on the preset electronic map. Each target geographic area includes one target location.

Still optionally, the communications interface 830 is further configured to receive, after sending the first information to the reminding device corresponding to the at least one reminding account, a message that is sent by the reminding device corresponding to the at least one reminding account and that indicates that the reminding device enters the target geographic area. The mobile terminal further includes the output interface 840. The output interface 840 includes the display panel and the loudspeaker, and is configured to issue the reminding information.

Further, after the communications interface 830 receives the message that is sent by the reminding device corresponding to the at least one reminding account and that indicates that the reminding device enters the target geographic area, the processor 820 is further configured to determine whether reminding devices corresponding to at least two reminding accounts enter the target area. If reminding devices corresponding to at least two reminding accounts enter the target area, the input interface 810 and the output interface 840 are further configured to learn a target reminding account that is selected by the user from the at least two reminding accounts. The communications interface 830 is further configured to send a notification message to a reminding device corresponding to the target reminding account. The preset reminding condition further includes receiving the notification message.

Still optionally, the communications interface 830 is further configured to receive, after sending the first information to the reminding device corresponding to the at least one reminding account, a message that is sent by the reminding device corresponding to the at least one reminding account and that indicates that the reminding information is confirmed. The processor 820 is further configured to clear a record about the reminding information.

It can be learned from the foregoing description that, in this embodiment of the present disclosure, the mobile terminal used as the indication device may include at least the input interface 810, the processor 820, and the communications interface 830. The input interface 810 obtains the reminding information and the reminding account that are set by the user A. The processor 820 generates a message that includes the reminding information. The communications interface 830 sends the message that includes the reminding information to a reminding device corresponding to each reminding account. After obtaining the reminding information and the target geographic area, the reminding device may issue the reminder after the reminding device enters the target geographic area or after the reminding device enters the target geographic area and meets another condition, so that the user B carrying or using the reminding device can obtain the location-based reminder. In addition, neither the user A nor the user B needs to additionally set the reminding information on the reminding device. Therefore, in this embodiment of the present disclosure, user operations are simplified, functions of a location-based reminder become more diversified, and interactivity is more desirable.

On the other hand, the mobile terminal may be the reminding device in FIG. 1A and FIG. 1B to FIG. 4A and FIG. 4B.

The communications interface 830 is configured to receive first information sent by an indication device. The first information includes reminding information. The processor 820 is configured to obtain second information according to the first information. The second information includes the reminding information and a target geographic area. The locator 850 and the processor 820 are configured to determine whether the mobile terminal meets a preset reminding condition. The preset reminding condition includes entering the target geographic area. The output interface 840 is configured to issue the reminding information if the mobile terminal meets the preset reminding condition.

Optionally, a specific operation of obtaining, by the processor 820, the second information according to the first information is obtaining the reminding information from the first information; determining the target geographic area related to the reminding information; and obtaining the second information that includes the reminding information and the target geographic area.

Further, the processor 820 is further configured to search, before determining the target geographic area related to the reminding information, a preset electronic map for a target location related to a keyword of the reminding information. A specific operation of determining, by the processor 820, the target geographic area related to the reminding information is determining the target geographic area that includes the target location on the preset electronic map.

Still further, if the processor 820 finds, on the preset electronic map, at least two target locations that have a same attribute, where the attribute is related to the keyword of the reminding information, a specific operation of determining, by the processor 820, the target geographic area that includes the target location on the preset electronic map is determining at least two target geographic areas on the preset electronic map. Each target geographic area includes one target location.

Still optionally, before the processor 820 determines whether the mobile terminal meets the preset reminding condition, the locator 850 and the communications interface 830 are further configured to send, to the indication device when it is detected that the mobile terminal enters the target geographic area, a message indicating that the mobile terminal enters the target geographic area.

Further, after the locator 850 and the communications interface 830 send, to the indication device when it is detected that the mobile terminal enters the target geographic area, the message indicating that the mobile terminal enters the target geographic area, the communications interface is further configured to receive a notification message sent by the indication device. The preset reminding condition further includes receiving the notification message.

Still optionally, the mobile terminal further includes the input interface 810. The input interface 810 includes the sensitive screen and the microphone. After the output interface 840 issues the reminding information, the processor 820 and the input interface 810 are configured to determine, when it is detected that the mobile terminal leaves the target geographic area, whether the reminding information is confirmed by the user. The communications interface 830 is further configured to send, to the indication device if the reminding information is confirmed by the user, a message indicating that the reminding information is confirmed.

It can be learned from the foregoing description that, in this embodiment of the present disclosure, the mobile terminal used as the reminding device may include at least the communications interface 830, the processor 820, the locator 850, and the output interface 840. The user A sets the reminding information on the indication device. The indication device sends a message that includes the reminding information. The communications interface 830 receives the message. The processor 820 obtains the target geographic area according to the message. After the locator 850 detects that the mobile terminal enters the target geographic area, or the locator 850 and the processor 820 determine that the mobile terminal enters the target geographic area and meets another condition, the output interface 840 issues the reminder, so that the user B carrying or using the mobile terminal can obtain the location-based reminder. In addition, neither the user A nor the user B needs to additionally set the reminding information on the mobile terminal. Therefore, in this embodiment of the present disclosure, user operations are simplified, functions of a location-based reminder become more diversified, and interactivity is more desirable.

FIG. 9 is a schematic structural diagram of a monitoring device according to an embodiment of the present disclosure. As shown in the figure, the monitoring device may include a communications interface 910, a modem 920, a processor 930, an output interface 940, a memory 950, and a power supply 960. The communications interface 910 may be another component such as an antenna that can receive and transmit a radio frequency signal, and is configured to communicate with another device. The modem 920 is configured to demodulate a radio frequency signal to an analog signal or modulate an analog signal to a radio frequency signal. The output interface 940 may be a display panel 941 and a loudspeaker 942 and is configured to remind a user, or may be another component that can remind a user, for example, a headset or a signal light. The memory 950 may be a high-speed RAM memory, or may be a nonvolatile memory, for example, at least one magnetic disk memory. The memory 950 may store program code, to instruct the processor 930 to perform a corresponding operation. The power supply 960 is configured to supply power to the monitoring device.

In a specific implementation process, the monitoring device may be the monitoring device in the embodiment described in FIG. 5.

The communications interface 910 is configured to receive a reminding account, a reminding distance, and location information of an indication device that are sent by the indication device. The communications interface 910 is configured to obtain location information of a reminding device to which the reminding account is logged in. The processor 930 is configured to detect a distance between the indication device and the reminding device according to the location information of the indication device and the location information of the reminding device. When the processor 930 detects that the distance between the indication device and the reminding device exceeds the reminding distance, the communications interface 910 is configured to send an indication message to the indication device, so that the indication device issues reminding information.

Optionally, the monitoring device further includes the output interface 940. Correspondingly, the communications interface 910 is further configured to receive the reminding information sent by the indication device. When the processor 930 detects that the distance between the indication device and the reminding device exceeds the reminding distance, the output interface 940 is configured to issue the reminding information.

Still optionally, a specific operation of obtaining, by the communications interface 910, the location information of the reminding device is the communications interface 910 sends a message for requesting the location information to the reminding device, so that the reminding device obtains the location information of the reminding device and sends the location information of the reminding device to the monitoring device, and the communications interface 910 receives the location information.

It can be learned from the foregoing description that, in this embodiment of the present disclosure, the monitoring device includes at least the communications interface 910, the processor 930, and the communications interface 910. The user A sets the reminding information and the reminding account on the indication device. The indication device sends the reminding information and the reminding account. The communications interface 910 receives the reminding information and the reminding account. When the processor 930 detects that the distance between the indication device and the reminding device corresponding to the reminding account exceeds the reminding distance, the communications interface 910 sends the message to the indication device, to control the reminding device to issue the reminder, so that the user A can be reminded when the distance between the indication device and the user B carrying or using the reminding device exceeds the reminding distance. In addition, neither the indication device nor the reminding device needs to detect the distance between the indication device and the reminding device, so that load of the indication device and load of the reminding device are reduced.

The technical solutions of the embodiments of the present disclosure essentially or the part contributing to the prior art may be implemented in a form of a computer software product. The computer software product is stored in a storage medium (such as a ROM/RAM, a magnetic disk, or an optical disc) and includes several instructions for controlling an indication device, a reminding device, and a monitoring device to perform all or some of the steps of the location-based reminding methods described in FIG. 1A and FIG. 1B to FIG. 5 of the embodiments of the present disclosure.

In the embodiments of the present disclosure, the user A sets the reminding information and the reminding account on the indication device; the indication device sends the reminding information set by the user A to the reminding device corresponding to each reminding account; and after obtaining the reminding information and the target geographic area, the reminding device may issue the reminding information after the reminding device enters the target geographic area or after the reminding device enters the target geographic area and meets another condition, so that the user B carrying or using the reminding device can obtain the location-based reminder. In addition, neither the user A nor the user B needs to additionally set the reminding information on the reminding device. Therefore, in the embodiments of the present disclosure, user operations are simplified, functions of a location-based reminder become more diversified, and interactivity is more desirable.

A person of ordinary skill in the art can understand that all or some of the processes of the methods in the embodiments may be implemented by a computer program instructing relevant hardware. The program may be stored in a computer readable storage medium. When the program runs, the processes of the method embodiments are performed. The foregoing storage medium may be a magnetic disk, an optical disc, a read-only memory (ROM), or a RAM.

A person of ordinary skill in the art can understand that all or some of the steps of the methods in the embodiments may be implemented by a program instructing relevant hardware. The program may be stored in a computer readable storage medium. When the program runs, one or a combination of the steps of the method embodiments are performed.

In addition, function units in the embodiments of the present disclosure may be integrated into one processing module, each of the units may exist alone physically, or at least two units may be integrated into one module. The integrated module may be implemented in a form of hardware, or may be implemented in a form of a software function module. When the integrated module is implemented in the form of a software function module and sold or used as an independent product, the integrated module may be stored in a computer readable storage medium.

In descriptions in this specification, descriptions about such reference terms as "an embodiment", "some embodiments", "an example", "a specific example", and "some examples" mean that specific features, structures, materials, or characteristics described with reference to the embodiments or examples are included in at least one embodiment or example of the present disclosure. In this specification, the foregoing examples of term expressions are not necessarily with respect to a same embodiment or example. In addition, the described specific features, structures, materials, or characteristics may be combined in a proper manner in any one or more of the embodiments or examples. In addition, a person skilled in the art may integrate or combine different embodiments or examples and characteristics of different embodiments or examples described in this specification, provided that they do not conflict with each other.

In addition, the terms "first" and "second" are merely intended for a purpose of description, and shall not be understood as an indication or implication of relative importance or an implicit indication of a quantity of indicated technical features. Therefore, features limited by "first" or "second" may explicitly or implicitly include at least one of the features. In the descriptions about the present disclosure, "multiple" means at least two, for example, two or three, unless otherwise specifically limited.

What is disclosed above is merely examples of embodiments of the present disclosure, and certainly is not intended to limit the scope of the claims of the present disclosure. Therefore, equivalent variations made in accordance with the claims of the present disclosure shall fall within the scope of the present disclosure.

What is claimed is:

1. A location-based reminding method, the method comprising:
   obtaining, by an indication device, reminding information and at least one reminding account that are set by a user, each of the at least one reminding account corresponding to at least one reminding device;
   searching, by the indication device, a preset electronic map for a target location related to a keyword of the reminding information;
   determining, by the indication device, a target geographic area related to the reminding information that comprises the target location on the preset electronic map;
   generating, by the indication device, first information that comprises the reminding information and the target geographic area;
   sending, by the indication device, the first information to a reminding device corresponding to the at least one reminding account so that the reminding device corresponding to the at least one reminding account obtains second information according to the first information, the second information comprising the reminding information and the target geographic area, each reminding device corresponding to the at least one reminding account issuing the reminding information when determining that the reminding device meets a preset reminding condition, and the preset reminding condition comprising entering the target geographic area;
   receiving, by the indication device, a message that is from the reminding device corresponding to the at least one reminding account and that indicates that the reminding information is confirmed; and
   clearing, by the indication device, a record about the reminding information.

2. The method according to claim 1, wherein determining, by the indication device, the target geographic area that comprises the target location on the preset electronic map comprises determining, by the indication device, at least two target geographic areas on the preset electronic map when the indication device finds, on the preset electronic map, at least two target locations that have a same attribute, the attribute being related to the keyword of the reminding information, and each target geographic area comprising one target location.

3. The method according to claim 1, wherein after sending, by the indication device, the first information to the reminding device corresponding to the at least one reminding account, the method comprises:
   receiving, by the indication device, a message from the reminding device corresponding to the at least one reminding account and indicating that the reminding device enters the target geographic area; and
   issuing, by the indication device, the reminding information.

4. The method according to claim 3, wherein after receiving, by the indication device, the message from the reminding device corresponding to the at least one reminding account and indicating that the reminding device enters the target geographic area, the method further comprises:
   determining, by the indication device, whether reminding devices corresponding to at least two reminding accounts enter the target geographic area;
   learning, by the indication device, a target reminding account selected by the user from the at least two reminding accounts when reminding devices corresponding to at least two reminding accounts enter the target geographic area; and sending, by the indication device, a notification message to a reminding device corresponding to the target reminding account, the preset reminding condition further comprising receiving the notification message.

5. The method according to claim 1, wherein the indication device corresponds to one indication account, after obtaining, by the indication device, the reminding information and the at least one reminding account that are set by a user, the method further comprising sending, by the indication device, the indication account and the at least one reminding account to a cloud server, and sending, by the indication device, the first information to the reminding device corresponding to the at least one reminding account comprising sending, by the indication device, the first information to the cloud server.

6. A location-based reminding method, comprising:
receiving, by a reminding device, first information from an indication device, the first information comprising reminding information;
obtaining, by the reminding device, second information according to the first information by:
  obtaining, by the reminding device, the reminding information from the first information;
  searching, by the reminding device, a preset electronic map for a target location related to a keyword of the reminding information:
  determining, by the reminding device, a target geographic area related to the reminding information that comprises the target location on the preset electronic map; and
  obtaining, by the reminding device, the second information comprising the reminding information and the target geographic area;
determining, by the reminding device, whether the reminding device meets a preset reminding condition, the preset reminding condition comprising entering the target geographic area;
issuing, by the reminding device, the reminding information when the reminding device meets the preset reminding condition;
determining, by the reminding device when detecting that the reminding device leaves the target geographic area, whether the reminding information is confirmed by a user; and
sending, by the reminding device to the indication device when the reminding information is confirmed by the user, a message indicating that the reminding information is confirmed.

7. The method according to claim 6, wherein the first information further comprises the target geographic area.

8. The method according to claim 6, wherein determining, by the reminding device, the target geographic area that comprises the target location on the preset electronic map comprises determining, by the reminding device, at least two target geographic areas on the preset electronic map when the reminding device finds, on the preset electronic map, at least two target locations that have a same attribute, the attribute being related to the keyword of the reminding information, and each target geographic area comprising one target location.

9. The method according to claim 6, wherein before determining, by the reminding device, whether the reminding device meets the preset reminding condition, the method further comprises sending, by the reminding device to the indication device when detecting that the reminding device enters the target geographic area, a message indicating that the reminding device enters the target geographic area.

10. The method according to claim 9, wherein after sending, by the reminding device to the indication device when detecting that the reminding device enters the target geographic area, the message indicating that the reminding device enters the target geographic area, the method further comprises receiving, by the reminding device, a notification message from the indication device, and the preset reminding condition further comprising receiving the notification message.

11. The method according to claim 6, wherein the indication device corresponds to one indication account, the reminding device corresponding to one reminding account, receiving, by the reminding device, the first information from the indication device comprising receiving, by the reminding device, the first information that is from the indication device by using a cloud server, the first information being forwarded by the cloud server according to a mapping relationship between the indication account and at least one reminding account, and the at least one reminding account comprising the reminding account corresponding to the reminding device.

12. A reminding device comprising:
a memory;
a transceiver; and
a processor coupled to the memory and the transceiver, the memory being configured to store a software program executable by the processor to instruct the reminding device to perform the following:
  receive first information from an indication device, the first information comprising reminding information;
  obtain the reminding information from the first information;
  search a preset electronic map for a target location related to a keyword of the reminding information;
  determine a target geographic area related to the reminding information that comprises the target location on the preset electronic map;
  obtain second information according to the first information, the second information comprising the reminding information and the target geographic area;
  determine whether the reminding device meets a preset reminding condition, the preset reminding condition comprising entering the target geographic area;
  issue the reminding information when the reminding device meets the preset reminding condition;
  determine whether the reminding information is confirmed by a user when detecting that the reminding device leaves the target geographic area; and
  send to the indication device when the reminding information is confirmed by the user, a message indicating that the reminding information is confirmed.

13. The reminding device according to claim 12, wherein the software program is executable by the processor to instruct the reminding device to perform determining at least two target geographic areas on the preset electronic map when the reminding device finds, on the preset electronic map, at least two target locations that have a same attribute, the attribute being related to the keyword of the reminding information, and each target geographic area comprising one target location.

14. The reminding device according to claim 12, wherein the software program is executable by the processor to instruct the reminding device to perform sending, to the indication device when detecting that the reminding device enters the target geographic area, a message indicating that the reminding device enters the target geographic area.

\* \* \* \* \*